United States Patent
Bull et al.

(10) Patent No.: US 10,254,621 B2
(45) Date of Patent: Apr. 9, 2019

(54) ELECTRO-OPTIC DISPLAYS, AND PROCESSES FOR THE PRODUCTION THEREOF

(71) Applicant: E Ink Corporation, Billerica, MA (US)

(72) Inventors: Stephen Bull, Windham, NH (US); Jay William Anseth, Canton, MA (US); George G. Harris, Woburn, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 15/802,616

(22) Filed: Nov. 3, 2017

(65) Prior Publication Data

US 2018/0074379 A1    Mar. 15, 2018

Related U.S. Application Data

(62) Division of application No. 14/989,031, filed on Jan. 6, 2016, now Pat. No. 9,835,925.

(60) Provisional application No. 62/100,950, filed on Jan. 8, 2015.

(51) Int. Cl.
   *G02F 1/153* (2006.01)
   *G02F 1/167* (2019.01)

(52) U.S. Cl.
   CPC .................... *G02F 1/167* (2013.01)

(58) Field of Classification Search
   CPC ........................................ G02F 1/153
   See application file for complete search history.

(56) References Cited

U.S. PATENT DOCUMENTS

| | | | |
|---|---|---|---|
| 4,418,346 A | 11/1983 | Batchelder | |
| 5,760,761 A | 6/1998 | Sheridon | |
| 5,777,782 A | 7/1998 | Sheridon | |
| 5,808,783 A | 9/1998 | Crowley | |
| 5,872,552 A | 2/1999 | Gordon, II | |
| 6,054,071 A | 4/2000 | Mikkelsen, Jr. | |
| 6,055,091 A | 4/2000 | Sheridon | |
| 6,097,531 A | 8/2000 | Sheridon | |
| 6,124,851 A | 9/2000 | Jacobson | |
| 6,128,124 A | 10/2000 | Silverman | |
| 6,130,773 A | 10/2000 | Jacobson | |

(Continued)

FOREIGN PATENT DOCUMENTS

WO    2000038000 A1    6/2000

OTHER PUBLICATIONS

United States Patent and Trademark Office, PCT/US2017/059887, "International Search Report and Written Opinion", dated Jan. 18, 2018. Jan. 18, 2018.

(Continued)

*Primary Examiner* — Daniel H Lee
(74) *Attorney, Agent, or Firm* — David J. Cole

(57) ABSTRACT

Improvements in the production of electro-optic displays include: (a) use of a masking film to keep a selected area of a backplane (such as a front electrode contact) free from electro-optic material; (b) spray coating of electrophoretic capsules on to a substrate under controlled conditions; (c) forming a monolayer of capsules on a substrate by prior deposition of a water-swellable polymer; and (d) overcoating a layer of electro-optic material with a solvent-free polymerizable liquid material, contacting this layer with a light-transmissive electrode layer, and polymerizing the liquid material to adhere the electrode layer to the electro-optic material.

6 Claims, 15 Drawing Sheets

(56) References Cited

U.S. PATENT DOCUMENTS

| | | |
|---|---|---|
| 6,130,774 A | 10/2000 | Albert |
| 6,137,467 A | 10/2000 | Sheridon |
| 6,144,361 A | 11/2000 | Gordon, II |
| 6,147,791 A | 11/2000 | Sheridon |
| 6,172,798 B1 | 1/2001 | Albert |
| 6,177,921 B1 | 1/2001 | Comiskey |
| 6,184,856 B1 | 2/2001 | Gordon, II |
| 6,225,971 B1 | 5/2001 | Gordon, II |
| 6,232,950 B1 | 5/2001 | Albert |
| 6,241,921 B1 | 6/2001 | Jacobson |
| 6,252,564 B1 | 6/2001 | Albert |
| 6,271,823 B1 | 8/2001 | Gordon, II |
| 6,301,038 B1 | 10/2001 | Fitzmaurice |
| 6,312,304 B1 | 11/2001 | Duthaler |
| 6,312,971 B1 | 11/2001 | Amundson |
| 6,337,761 B1 | 1/2002 | Rogers |
| 6,376,828 B1 | 4/2002 | Comiskey |
| 6,392,786 B1 | 5/2002 | Albert |
| 6,413,790 B1 | 7/2002 | Duthaler |
| 6,422,687 B1 | 7/2002 | Jacobson |
| 6,445,374 B2 | 9/2002 | Albert |
| 6,480,182 B2 | 11/2002 | Turner |
| 6,498,114 B1 | 12/2002 | Amundson |
| 6,506,438 B2 | 1/2003 | Duthaler |
| 6,518,949 B2 | 2/2003 | Drzaic |
| 6,521,489 B2 | 2/2003 | Duthaler et al. |
| 6,535,197 B1 | 3/2003 | Comiskey |
| 6,545,291 B1 | 4/2003 | Amundson |
| 6,639,578 B1 | 10/2003 | Comiskey |
| 6,657,772 B2 | 12/2003 | Loxley |
| 6,664,944 B1 | 12/2003 | Albert |
| D485,294 S | 1/2004 | Albert |
| 6,680,725 B1 | 1/2004 | Jacobson |
| 6,683,333 B2 | 1/2004 | Kazlas |
| 6,724,519 B1 | 4/2004 | Comiskey |
| 6,750,473 B2 | 6/2004 | Amundson |
| 6,816,147 B2 | 11/2004 | Albert |
| 6,819,471 B2 | 11/2004 | Amundson |
| 6,825,068 B2 | 11/2004 | Denis |
| 6,825,829 B1 | 11/2004 | Albert |
| 6,831,769 B2 | 12/2004 | Holman |
| 6,839,158 B2 | 1/2005 | Albert |
| 6,842,167 B2 | 1/2005 | Albert |
| 6,842,279 B2 | 1/2005 | Amundson |
| 6,842,657 B1 | 1/2005 | Drzaic |
| 6,865,010 B2 | 3/2005 | Duthaler et al. |
| 6,866,760 B2 | 3/2005 | Paolini, Jr. |
| 6,870,657 B1 | 3/2005 | Fitzmaurice |
| 6,922,276 B2 | 7/2005 | Zhang et al. |
| 6,950,220 B2 | 9/2005 | Abramson et al. |
| 6,967,640 B2 | 11/2005 | Albert et al. |
| 6,980,196 B1 | 12/2005 | Turner et al. |
| 6,982,178 B2 | 1/2006 | LeCain et al. |
| 7,002,728 B2 | 2/2006 | Pullen et al. |
| 7,012,600 B2 | 3/2006 | Zehner |
| 7,012,735 B2 | 3/2006 | Honeyman et al. |
| 7,030,412 B1 | 4/2006 | Drzaic et al. |
| 7,075,502 B1 | 7/2006 | Drzaic |
| 7,075,703 B2 | 7/2006 | O'Neil et al. |
| 7,106,296 B1 | 9/2006 | Jacobson |
| 7,110,163 B2 | 9/2006 | Webber et al. |
| 7,116,318 B2 | 10/2006 | Amundson |
| 7,148,128 B2 | 12/2006 | Jacobson |
| 7,167,155 B1 | 1/2007 | Albert et al. |
| 7,170,670 B2 | 1/2007 | Webber |
| 7,173,752 B2 | 2/2007 | Doshi et al. |
| 7,176,880 B2 | 2/2007 | Amundson et al. |
| 7,190,008 B2 | 3/2007 | Amundson et al. |
| 7,206,119 B2 | 4/2007 | Honeyman et al. |
| 7,223,672 B2 | 5/2007 | Kazlas et al. |
| 7,230,751 B2 | 6/2007 | Whitesides et al. |
| 7,236,291 B2 | 6/2007 | Kaga et al. |
| 7,236,292 B2 | 6/2007 | LeCain |
| 7,242,513 B2 | 7/2007 | Albert et al. |
| 7,256,766 B2 | 8/2007 | Albert et al. |
| 7,259,744 B2 | 8/2007 | Arango |
| 7,280,094 B2 | 10/2007 | Albert |
| 7,312,784 B2 | 12/2007 | Baucom et al. |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,349,148 B2 | 3/2008 | Doshi et al. |
| 7,352,353 B2 | 4/2008 | Albert |
| 7,365,394 B2 | 4/2008 | Denis et al. |
| 7,365,733 B2 | 4/2008 | Duthaler |
| 7,382,363 B2 | 6/2008 | Albert et al. |
| 7,388,572 B2 | 6/2008 | Duthaler et al. |
| 7,411,719 B2 | 8/2008 | Paolini, Jr. et al. |
| 7,420,549 B2 | 9/2008 | Jacobson |
| 7,442,587 B2 | 10/2008 | Amundson et al. |
| 7,443,571 B2 | 10/2008 | LeCain et al. |
| 7,453,445 B2 | 11/2008 | Amundson |
| 7,492,497 B2 | 2/2009 | Paolini, Jr. |
| 7,513,813 B2 | 4/2009 | Paolini, Jr. et al. |
| 7,535,624 B2 | 5/2009 | Amundson et al. |
| 7,551,346 B2 | 6/2009 | Fazel |
| 7,554,712 B2 | 6/2009 | Patry et al. |
| 7,561,324 B2 | 7/2009 | Duthaler et al. |
| 7,583,427 B2 | 9/2009 | Danner |
| 7,598,173 B2 | 10/2009 | Ritenour |
| 7,605,799 B2 | 10/2009 | Amundson et al. |
| 7,636,191 B2 | 12/2009 | Duthaler |
| 7,649,666 B2 | 1/2010 | Isobe et al. |
| 7,649,674 B2 | 1/2010 | Danner |
| 7,667,886 B2 | 2/2010 | Danner |
| 7,672,040 B2 | 3/2010 | Sohn |
| 7,679,814 B2 | 3/2010 | Paolini, Jr. et al. |
| 7,688,497 B2 | 3/2010 | Danner |
| 7,728,811 B2 | 6/2010 | Albert et al. |
| 7,729,039 B2 | 6/2010 | LeCain et al. |
| 7,733,335 B2 | 6/2010 | Zehner |
| 7,733,554 B2 | 6/2010 | Danner et al. |
| 7,785,988 B2 | 8/2010 | Amundson |
| 7,791,782 B2 | 9/2010 | Paolini, Jr. |
| 7,826,129 B2 | 11/2010 | Wu |
| 7,839,564 B2 | 11/2010 | Whitesides et al. |
| 7,843,621 B2 | 11/2010 | Danner et al. |
| 7,843,624 B2 | 11/2010 | Danner |
| 7,843,626 B2 | 11/2010 | Amundson et al. |
| 7,859,637 B2 | 12/2010 | Amundson et al. |
| 7,893,435 B2 | 2/2011 | Kazlas et al. |
| 7,898,717 B2 | 3/2011 | Patry |
| 7,910,175 B2 * | 3/2011 | Webber .............. C25D 5/02 359/296 |
| 7,957,053 B2 | 6/2011 | Honeyman |
| 7,986,450 B2 | 7/2011 | Cao |
| 8,009,344 B2 | 8/2011 | Danner |
| 8,009,348 B2 | 8/2011 | Zehner |
| 8,027,081 B2 | 9/2011 | Danner |
| 8,034,209 B2 | 10/2011 | Danner |
| 8,049,947 B2 | 11/2011 | Danner |
| 8,068,272 B2 | 11/2011 | LeCain et al. |
| 8,077,141 B2 | 12/2011 | Duthaler |
| 8,077,381 B2 | 12/2011 | LeCain et al. |
| 8,089,453 B2 | 1/2012 | Comiskey |
| 8,177,942 B2 | 5/2012 | Paolini, Jr. |
| 8,208,193 B2 | 6/2012 | Patry |
| 8,319,759 B2 | 11/2012 | Jacobson |
| 8,373,211 B2 | 2/2013 | Amundson |
| 8,389,381 B2 | 3/2013 | Amundson |
| 8,390,301 B2 | 3/2013 | Danner |
| 8,482,835 B2 | 7/2013 | LeCain |
| 8,498,042 B2 | 7/2013 | Danner |
| 8,576,476 B2 | 11/2013 | Telfer |
| 8,610,988 B2 | 12/2013 | Zehner et al. |
| 8,728,266 B2 | 5/2014 | Danner |
| 8,754,859 B2 | 6/2014 | Gates |
| 8,786,929 B2 | 7/2014 | LeCain |
| 8,830,553 B2 | 9/2014 | Patry |
| 8,830,560 B2 | 9/2014 | Danner |
| 8,854,721 B2 | 10/2014 | Danner |
| 8,891,155 B2 | 11/2014 | Danner |
| 8,969,886 B2 | 3/2015 | Amundson |
| 8,994,705 B2 | 3/2015 | Jacobson |

(56) References Cited

U.S. PATENT DOCUMENTS

| | | |
|---|---|---|
| 9,075,280 B2 | 7/2015 | Whitesides |
| 9,152,003 B2 | 10/2015 | Danner |
| 9,152,004 B2 | 10/2015 | Paolini, Jr. |
| 9,164,207 B2 | 10/2015 | Honeyman et al. |
| 9,238,340 B2 | 1/2016 | Kayal |
| 9,310,661 B2 | 4/2016 | Wu |
| 9,419,024 B2 | 8/2016 | Amundson |
| 9,554,495 B2 | 1/2017 | Danner |
| 9,620,066 B2 | 4/2017 | Bishop |
| 9,671,635 B2 | 6/2017 | Paolini, Jr. |
| 9,733,540 B2 | 8/2017 | LeCain et al. |
| 9,835,925 B1 | 12/2017 | Bull et al. |
| 2002/0060321 A1 | 5/2002 | Kazlas |
| 2004/0105036 A1 | 6/2004 | Danner et al. |
| 2004/0217929 A1* | 11/2004 | Albert .................. B41J 3/4076 345/84 |
| 2005/0122306 A1 | 6/2005 | Wilcox et al. |
| 2005/0122563 A1 | 6/2005 | Honeyman et al. |
| 2007/0052757 A1 | 3/2007 | Jacobson |
| 2009/0122389 A1 | 5/2009 | Whitesides |
| 2009/0168067 A1 | 7/2009 | LeCain et al. |
| 2009/0315044 A1 | 12/2009 | Amundson |
| 2011/0140744 A1 | 6/2011 | Kazlas |
| 2011/0164301 A1 | 7/2011 | Paolini, Jr. |
| 2011/0187683 A1 | 8/2011 | Wilcox |
| 2011/0292319 A1 | 12/2011 | Cole |
| 2012/0293858 A1 | 11/2012 | Telfer |
| 2013/0278900 A1 | 10/2013 | Hertel et al. |
| 2014/0078024 A1 | 3/2014 | Paolini, Jr. |
| 2014/0139501 A1 | 5/2014 | Amundson |
| 2014/0300837 A1 | 10/2014 | Gates |
| 2015/0226986 A1 | 8/2015 | Paolini, Jr. |
| 2015/0227018 A1 | 8/2015 | Paolini, Jr. |
| 2015/0261057 A1 | 9/2015 | Harris |

OTHER PUBLICATIONS

Wood, D., "An Electrochromic Renaissance?" Information Display, 18(3), 24 (Mar. 2002) Mar. 1, 2002.

O'Regan, B. et al., "A Low Cost, High-efficiency Solar Cell Based on Dye-sensitized colloidal TiO2 Films", Nature, vol. 353, pp. 737-740 (Oct. 24, 1991). Oct. 24, 1991.

Bach, U. et al., "Nanomaterials-Based Electrochromics for Paper-Quality Displays", Adv. Mater, vol. 14, No. 11, pp. 845-848 (Jun. 2002). Jun. 5, 2002.

Hayes, R.A. et al., "Video-Speed Electronic Paper Based on Electrowetting", Nature, vol. 425, No. 25, pp. 383-385 (Sep. 2003). Sep. 25, 2003.

Kitamura, T. et al., "Electrical toner movement for electronic paper-like display", Asia Display/IDW '01, pp. 1517-1520, Paper HCS1-1 (2001). Jan. 1, 2001.

Yamaguchi, Y. et al., "Toner display using insulative particles charged triboelectrically", Asia Display/IDW '01, pp. 1729-1730, Paper AMD4-4 (2001). Jan. 1, 2001.

\* cited by examiner

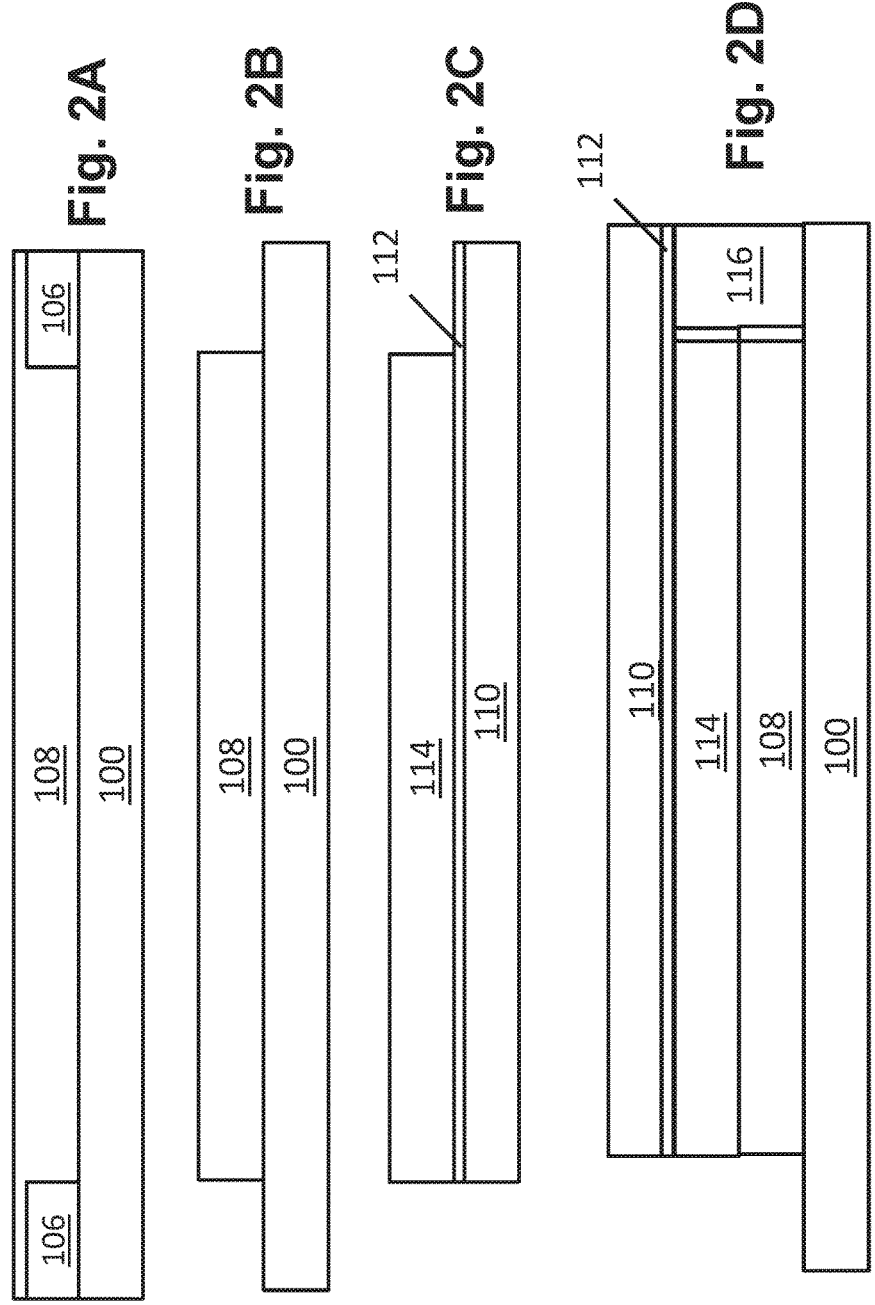

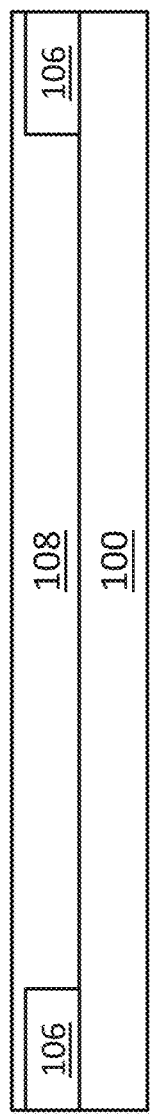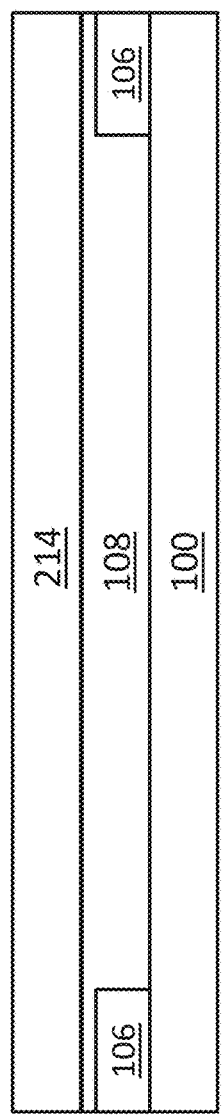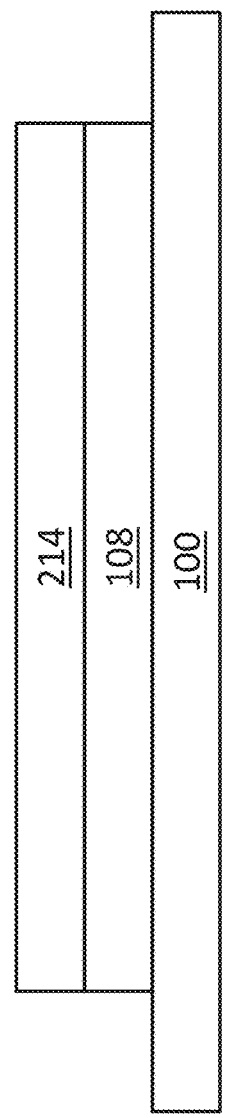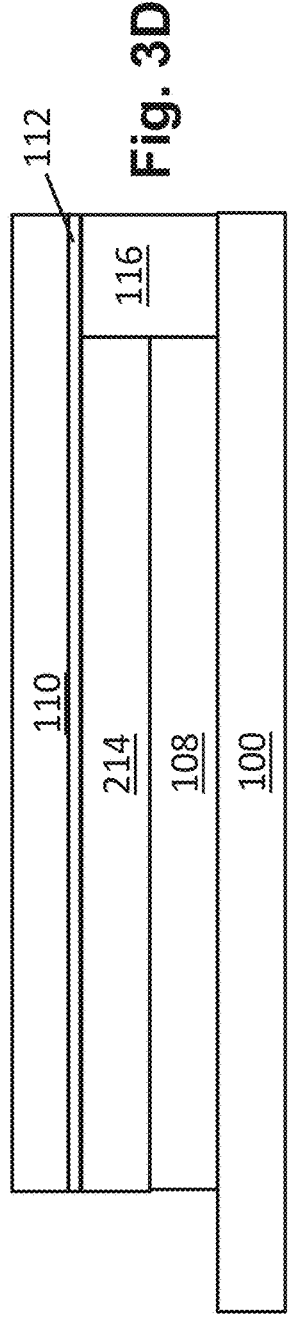

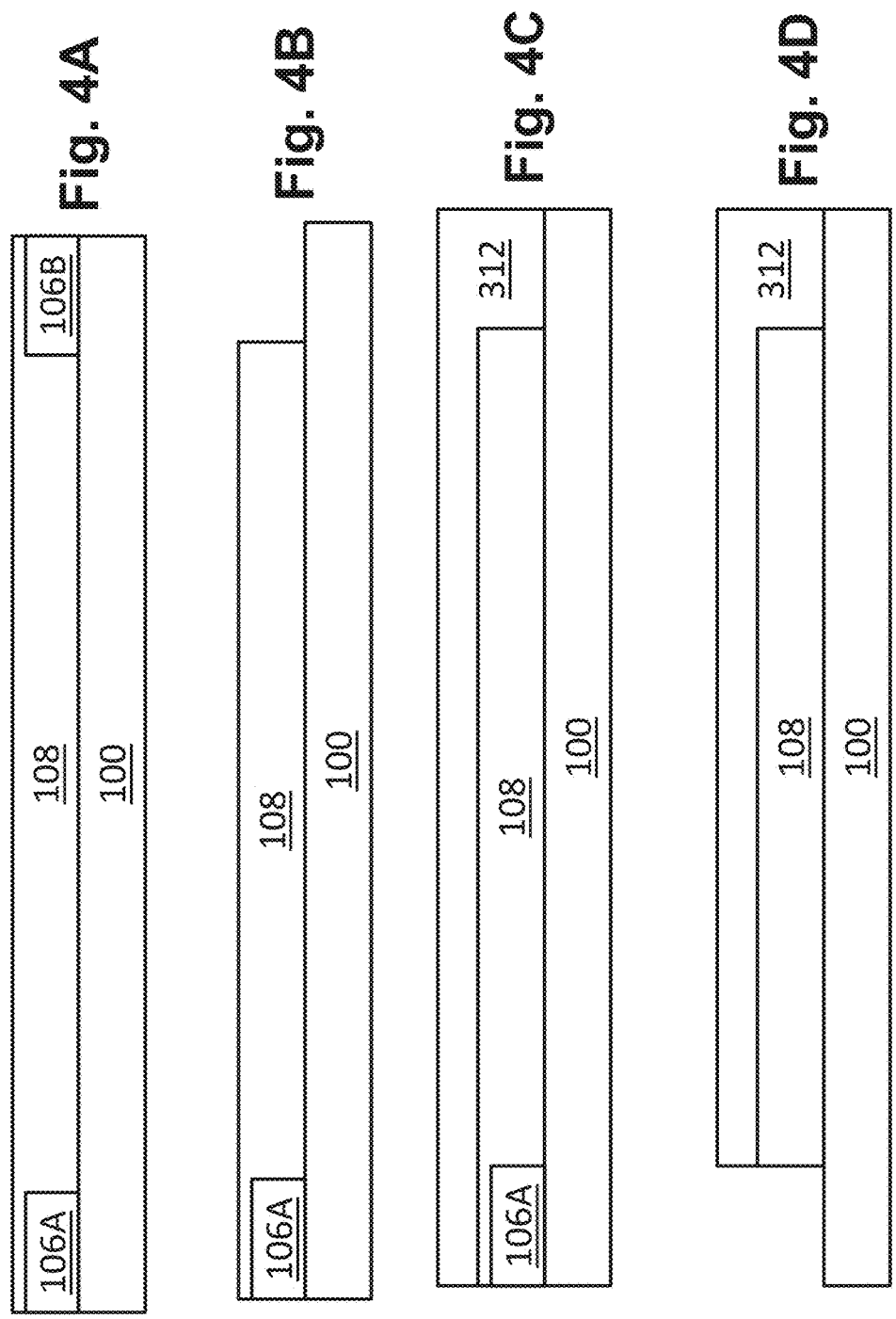

ELECTRO-OPTIC DISPLAYS, AND PROCESSES FOR THE PRODUCTION THEREOF

REFERENCE TO RELATED APPLICATIONS

This application is a division of copending application Ser. No. 14/989,031, filed Jan. 6, 2016, claims benefit of provisional Application Ser. No. 62/100,950, filed Jan. 8, 2015.

This application is related to U.S. Pat. Nos. 6,982,178; 7,561,324; and 7,839,564. The entire contents of these patents, and of all other U.S. patents and published and copending applications mentioned below, are herein incorporated by reference.

BACKGROUND OF INVENTION

This invention relates to electro-optic displays and processes for the production thereof. More specifically, this invention relates to processes for the production of electro-optic displays without the use of front plane laminates, inverted front plane laminates and double release films as described in the aforementioned U.S. Pat. Nos. 6,982,178; 7,561,324; and 7,839,564, and to processes for depositing encapsulated electrophoretic media by spraying.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme which only drives pixels to their two extreme optical states with no intervening gray states.

Some electro-optic materials are solid in the sense that the materials have solid external surfaces, although the materials may, and often do, have internal liquid- or gas-filled spaces. Such displays using solid electro-optic materials may hereinafter for convenience be referred to as "solid electro-optic displays". Thus, the term "solid electro-optic displays" includes rotating bichromal member displays, encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728; and 7,679,814;

(b) Capsules, binders and encapsulation processes; see for example U.S. Pat. Nos. 6,922,276; and 7,411,719;

(c) Films and sub-assemblies containing electro-optic materials; see for example U.S. Pat. Nos. 6,825,829; 6,982,178; 7,236,292; 7,443,571; 7,513,813; 7,561,324; 7,636,191; 7,649,666; 7,728,811; 7,729,039; 7,791,782; 7,839,564; 7,843,621; 7,843,624; 8,034,209; 8,068,272; 8,077,381; 8,177,942; 8,390,301; 8,482,852; 8,786,929; 8,830,553; 8,854,721; and 9,075,280; and U.S. Patent Applications Publication Nos. 2009/0109519; 2009/0168067; 2011/0164301; 2014/0027044; 2014/0115884; and 2014/0340738;

(d) Backplanes, adhesive layers and other auxiliary layers and methods used in displays; see for example U.S. Pat. Nos. D485,294; 6,124,851; 6,130,773; 6,177,921; 6,232,950; 6,252,564; 6,312,304; 6,312,971; 6,376,828; 6,392,786; 6,413,790; 6,422,687; 6,445,374; 6,480,182; 6,498,114; 6,506,438; 6,518,949; 6,521,489; 6,535,197; 6,545,291; 6,639,578; 6,657,772; 6,664,944; 6,680,725; 6,683,333; 6,724,519; 6,750,473; 6,816,147; 6,819,471; 6,825,068; 6,831,769; 6,842,167; 6,842,279; 6,842,657; 6,865,010; 6,967,640; 6,980,196; 7,012,735; 7,030,412; 7,075,703; 7,106,296; 7,110,163; 7,116,318; 7,148,128; 7,167,155; 7,173,752; 7,176,880; 7,190,008; 7,206,119; 7,223,672; 7,230,751; 7,256,766; 7,259,744; 7,280,094; 7,327,511; 7,349,148; 7,352,353; 7,365,394; 7,365,733; 7,382,363; 7,388,572; 7,442,587; 7,492,497; 7,535,624; 7,551,346; 7,554,712; 7,583,427; 7,598,173; 7,605,799; 7,636,191; 7,649,674; 7,667,886; 7,672,040; 7,688,497; 7,733,335; 7,785,988; 7,843,626; 7,859,637; 7,893,435; 7,898,717; 7,957,053; 7,986,450; 8,009,344; 8,027,081; 8,049,947; 8,077,141; 8,089,453; 8,208,193; 8,373,211; 8,389,381; 8,498,042; 8,610,988; 8,728,266; 8,754,859; 8,830,560; 8,891,155; 8,989,886; 9,152,003; and 9,152,004; and U.S. Patent Applications Publication Nos. 2002/0060321; 2004/0105036; 2005/0122306; 2005/0122563; 2007/0052757; 2007/0097489; 2007/0109219; 2009/0122389; 2009/0315044; 2011/0026101; 2011/0140744; 2011/0187683; 2011/0187689; 2011/0292319; 2013/0278900; 2014/0078024; 2014/0139501; 2014/0300837; 2015/0171112; 2015/0205178; 2015/0226986; 2015/0227018; 2015/0228666; and 2015/0261057; and International Application Publication No. WO 00/38000; European Patents Nos. 1,099,207 B 1 and 1,145,072 B 1;

(e) Color formation and color adjustment; see for example U.S. Pat. Nos. 7,075,502; and 7,839,564;

(f) Methods for driving displays; see for example U.S. Pat. Nos. 7,012,600; and 7,453,445;

(g) Applications of displays; see for example U.S. Pat. Nos. 7,312,784; and 8,009,348; and (h) Non-electrophoretic displays, as described in U.S. Pat. Nos. 6,241,921; 6,950,220; 7,420,549; 8,319,759; and 8,994,705; and U.S. Patent Application Publication No. 2012/0293858.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

Other types of electro-optic materials may also be used in the present invention.

An electro-optic display normally comprises a layer of electro-optic material and at least two other layers disposed on opposed sides of the electro-optic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electro-optic display, which is intended for use with a stylus, print head or similar movable electrode separate from the display, only one of the layers adjacent the electro-optic layer comprises an electrode, the layer on the opposed side of the electro-optic layer typically being a protective layer intended to prevent the movable electrode damaging the electro-optic layer.

The manufacture of a three-layer electro-optic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display usable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive. Similar manufacturing techniques can be used with other types of electro-optic displays As discussed in the aforementioned U.S. Pat. No. 6,982,178, (see column 3, lines 63 to column 5, line 46) many of the components used in solid electro-optic displays, and the methods used to manufacture such displays, are derived from technology used in liquid crystal displays (LCD's), which are of course also electro-optic displays, though using a liquid rather than a solid medium. For example, solid electro-optic displays may make use of an active matrix backplane comprising an array of transistors or diodes and a corresponding array of pixel electrodes, and a "continuous" front electrode (in the sense of an electrode which extends over multiple pixels and typically the whole display) on a transparent substrate, these components being essentially the same as in LCD's. However, the methods used for assembling LCD's cannot be used with solid electro-optic displays. LCD's are normally assembled by forming the backplane and front electrode on separate glass substrates, then adhesively securing these components together leaving a small aperture between them, placing the resultant assembly under vacuum, and immersing the assembly in a bath of the liquid crystal, so that the liquid crystal flows through the aperture between the backplane and the front electrode. Finally, with the liquid crystal in place, the aperture is sealed to provide the final display.

This LCD assembly process cannot readily be transferred to solid electro-optic displays. Because the electro-optic material is solid, it must be present between the backplane and the front electrode before these two integers are secured to each other. Furthermore, in contrast to a liquid crystal material, which is simply placed between the front electrode and the backplane without being attached to either, a solid electro-optic medium normally needs to be secured to both; in most cases the solid electro-optic medium is formed on the front electrode, since this is generally easier than forming the medium on the circuitry-containing backplane, and the front electrode/electro-optic medium combination is then laminated to the backplane, typically by covering the entire surface of the electro-optic medium with an adhesive and laminating under heat, pressure and possibly vacuum. Accordingly, most prior art methods for final lamination of solid electrophoretic displays are essentially batch methods in which (typically) the electro-optic medium, a lamination adhesive and a backplane are brought together immediately prior to final assembly, and it is desirable to provide methods better adapted for mass production.

Electro-optic displays are often costly; for example, the cost of the color LCD found in a portable computer is typically a substantial fraction of the entire cost of the computer. As the use of electro-optic displays spreads to devices, such as cellular telephones and personal digital assistants (PDA's), much less costly than portable computers, there is great pressure to reduce the costs of such displays. The ability to form layers of some solid electro-optic media by printing techniques on flexible substrates, as discussed above, opens up the possibility of reducing the cost of electro-optic components of displays by using mass production techniques such as roll-to-roll coating using commercial equipment used for the production of coated papers, polymeric films and similar media.

The aforementioned U.S. Pat. No. 6,982,178 describes a method of assembling a solid electro-optic display (including an encapsulated electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term "light-transmissive" should of course be interpreted to refer to transmission of the relevant non-visible wavelengths. The substrate will typically be a polymeric film, and will normally have a thickness in the range of about 1 to about 25 mil (25 to 634 µm), preferably about 2 to about 10 mil (51 to 254 µm). The electrically-conductive layer is conveniently a thin metal or metal oxide layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

The aforementioned U.S. Pat. No. 6,982,178 also describes a method for testing the electro-optic medium in a front plane laminate prior to incorporation of the front plane laminate into a display. In this testing method, the release sheet is provided with an electrically conductive layer, and a voltage sufficient to change the optical state of the electro-optic medium is applied between this electrically conductive layer and the electrically conductive layer on the opposed side of the electro-optic medium. Observation of the electro-optic medium will then reveal any faults in the medium, thus avoiding laminating faulty electro-optic medium into a display, with the resultant cost of scrapping the entire display, not merely the faulty front plane laminate.

The aforementioned U.S. Pat. No. 6,982,178 also describes a second method for testing the electro-optic medium in a front plane laminate by placing an electrostatic charge on the release sheet, thus forming an image on the electro-optic medium. This image is then observed in the same way as before to detect any faults in the electro-optic medium.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

The aforementioned U.S. Pat. No. 7,561,324 describes a so-called "double release sheet" which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

The aforementioned U.S. Pat. No. 7,839,564 describes a so-called "inverted front plane laminate", which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electro-optic medium; and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance.

As already indicated, the aforementioned front plane laminates, inverted front plane laminates and double release films are well adapted for production by roll-to-roll processes, thus producing the front plane laminate, inverted front plane laminate or double release film in the form of a roll of material which can be severed into pieces of the size needed for individual displays and laminated to appropriate backplanes. However, also as already indicated, to effect the necessary lamination, and layer of lamination adhesive normally needs to be present between the electro-optic layer itself and the backplane, and this layer of lamination adhesive remains in the final display between the two electrodes. The presence of this lamination adhesive layer has significant effects on the electro-optic properties of the display. Inevitably, some of the voltage drop between the electrodes occurs within the lamination adhesive layer, thus reducing the voltage available for driving the electro-optic layer. The effect of the lamination adhesive tends to become greater at lower temperatures, and this variation in the effect of lamination adhesive with temperature complicates the driving of the display. The voltage drop within the lamination adhesive can be reduced, and the low temperature operation of the display improved, by increasing the conductivity of the lamination adhesive layer, for example by doping the layer with tetrabutylammonium hexafluorophosphate or other materials as described in U.S. Pat. Nos. 7,012,735 and 7,173,752. However, increasing the conductivity of the lamination adhesive layer in this manner tends to increase pixel blooming (a phenomenon whereby the area of the electro-optic layer which changes optical state in response to change of voltage at a pixel electrode is larger than the pixel electrode itself), and this blooming tends to reduce the resolution of the display. Hence, this type of display apparently intrinsically requires a compromise between low temperature performance and display resolution.

One aspect of the present invention relates to processes for the production of electro-optic displays which do not require the presence of a lamination adhesive layer between the electro-optic layer and the backplane; these processes involve coating the electro-optic material on to the backplane.

A second aspect of the present invention relates to novel processes for application of encapsulated electrophoretic media to substrates. These processes may be used to aid in the first aspect of the invention but may also be used in other types of coating processes.

The electrophoretic media described in the aforementioned E Ink patents and applications, and similar prior art electrophoretic media typically comprise electrophoretic particles, charge control agents, image stability agents and flocculants in a non-polar liquid, typically encapsulated in a flexible organic matrix such as a gelatin/acacia coacervate. To produce commercial displays, it is necessary to coat a thin layer (preferably a monolayer—see U.S. Pat. No. 6,839, 158) of capsules on a substrate, which may be a front substrate bearing an electrode (see the aforementioned U.S. Pat. No. 6,982,178), a backplane or a release sheet. Hitherto, coating of encapsulated electrophoretic media on substrates has typically been effected by slot coating, in which a slurry of capsules in a carrier medium is forced through a slot on to a substrate which is moving relative to the slot. Slot coating imposes limitations upon the viscosity and other physical properties of the material being coated and typically requires the addition of slot coating additives to control the rheology of the coated material to ensure that the coating does not flow and develop non-uniformities in thickness prior to drying. Thus, in slot coating electrophoretic capsules are typically supplied in the form of aqueous slurries containing optional latex binder, rheology modification agents, ionic dopants, and surfactants. These additives remain in the final dried electrophoretic medium and may affect its properties, including its electro-optic properties.

Furthermore, although slot coating is well adapted for applying electrophoretic media to continuous webs, it is not well adapted for "patch" coating of discrete areas of a web or discrete parts (for example, individual backplanes) lying on a moving belt, since settling and self-segregation of capsule slurry within the slot die manifold become problematic during such "interrupted" capsule deposition processes. Slot coating is generally not useful for non-planar substrates, which is unfortunate since encapsulated electrophoretic media are well adapted for coating three-dimensional objects, including architectural features. Other problems with slot coating include chatter-like streaks parallel to the coating slot die (these streaks are believed to result from periodic bunching or jamming of capsules), and streaking in the direction of coating (believed to be due to capsule jamming or non-uniform flows in delivery of capsules to the slot coating slot die).

The aforementioned problems with slot coating have resulted in a search for an alternative coating technology able to cope with patch coating and coating of non-planar substrates, as well as planar objects and webs. One well established coating technology which has been considered for this purpose is spray coating, i.e., the pneumatic atomization and deposition of capsule dispersions. Spray coating is a mature technology, but prior art attempts to apply the technology to capsule deposition have been subject to various defects and modes of failure. Because they typically have flexible capsule walls, capsules deform and sometime rupture during spraying, either during the atomization step or upon impact on the target. The consequences of significant capsule rupture, including the release of electrophoretic particles, fluid etc., are so severe that, so far as the present inventors are aware, unacceptable levels of ruptured capsules have by themselves been sufficient to doom all previous attempts to spray coat encapsulated electrophoretic media. The second aspect of the present invention provides a spray coating process which reduces or eliminates these problems.

A third aspect of the present invention relates to processes for reducing the adhesion of capsules to a substrate during coating in order to facilitate close packing of capsules on the substrate. This adhesion reduction process is primarily intended for use with spray coating of capsules but may also be useful with other capsule deposition techniques.

As previously mentioned, in the production of electrophoretic displays it is generally preferred to form a monolayer of capsules on a substrate. However, a common problem encountered when coating electrophoretic capsules on to a substrate (typically a ITO/PET film, a PET/release film, or any type of silicone release film) is that the capsules adhere strongly to the substrate and are unable to rearrange themselves into an optimally packed monolayer upon drying. Various coating materials have been found to significantly reduce capsule-substrate adhesion, thus allowing the capsules to rearrange themselves by means of capillary forces during drying. Unfortunately, if such coating materials are used in slot coating processes employing a doctor blade, as is common during slot coating, the reduced capsule-substrate adhesion causes the capsules to not pass properly past the doctor blade; instead, the vast majority of the capsules are simply pushed in front of the doctor blade, leaving only a very sparse capsule coating on the substrate. Accordingly, there is a need for an improved process for the formation of closely packed monolayers of capsules on substrates, and the third aspect of the present invention seeks to provide such a process.

A fourth aspect of the present invention relates to processes for overcoating electro-optic materials to planarize an electro-optic layer and/or adhere the electro-optic layer to a transparent front electrode that may be attached to a color filter.

It is known (see especially U.S. Pat. No. 7,839,564) that a color display may be formed by overlaying a color filter array (CFA) over an monochromatic black/white electro-optic display, with the CFA elements aligned with the pixel electrodes of the backplane. Such a CFA may for example have repeating red, green and blue stripes, or a repeating 2×2 red/green/blue/white (clear) pixel pattern. The brightest state of such a display is achieved when all pixels of the electro-optic layer are white, and it is therefore preferred that the absorption of the CFA elements, taken as a whole, be constant across the visible range, so that the brightest state will have no color tint.

Overlaying a CFA over an electro-optic layer in this manner leads to a trade-off between brightness and color saturation, and the colors that are most difficult to render are the brightest colors, such as white and yellow. Moreover, such a display suffers from several sources of light loss or contamination that limit still further the quality of color attainable. These include:

(a) absorption of light by the white state of the electro-optic layer that limits the brightness of all colors; this may be as much as 50% of light incident on a white region of the electro-optic layer;

(b) reflection of light by the dark state of the electro-optic layer, causing pollution of a desired color by unwanted light of other colors;

(c) contrast at the pixel level ("local contrast") may be lower than the contrast measured if the entire display is switched from the white state to the dark state, due to electrical effects at the edges of pixels (i.e., image "blooming") or to optical effects related to the scattering length within the electro-optic layer (i.e., "optical dot gain");

(d) loss of light due to total internal reflection within the display; since electrophoretic and most other reflective electro-optic layer are Lambertian reflectors, a significant proportion of light may be reflected at angles to the normal greater than the critical angle for total internal reflection at at least one surface between adjacent layers of the display and be lost;

(e) illumination parallax: if the CFA elements are significantly separated from the electro-optic layer by intervening layers, light incident on the display at sufficiently large angles to the normal may pass through a color filter element of one color and exit the display through an element of a different color, leading to pollution of the colored image and a color shift; and (f) viewing parallax: for the same reasons as in (e), if a viewer observes the display at a sufficiently large angle to the normal, and the CFA elements are significantly separated from the electro-optic layer, the viewer may see modulation of reflectivity through an unintended color filter element.

When an electro-optic display is formed using a front plane laminate, as described above with reference to U.S. Pat. No. 6,982,178, a single adhesive layer is present between the electro-optic layer and the backplane. Although this adhesive layer is not disposed between the electro-optic layer and the CFA (and thus does not contribute to most of the problems discussed above), it is present between the electrodes of the display, and thus contributes to image blooming. The presence of this adhesive layer also diminishes the voltage drop actually occurring across the electro-optic layer, which tends to limit the reflectivity of the white state of the electro-optic layer and its contrast ratio. When an electro-optic display is formed using either a double release film, as described above with reference to U.S. Pat. No. 7,561,324, or an inverted front plane laminate, as described above with reference to U.S. Pat. No. 7,839,564, typically two adhesive layers will be present, the first between the CFA and the electro-optic layer, and the second between the electro-optic layer and the backplane. The second adhesive layer contributes to the same problems as the adhesive layer derived from an FPL, as already discussed; the first adhesive layer at least contributes to the illumination and viewing parallax problems, and may also contribute to the total internal reflection problem.

There is thus a need for a process for producing electro-optic displays which reduces or eliminates the problems caused by the presence of adhesive layers between the electrodes. However, since as discussed above, manufacture of electro-optic displays necessitates at least one lamination operation, the best process will involve the provision of only one thin adhesive layer, and the present invention seeks to provide such a process.

SUMMARY OF INVENTION

Accordingly, in one aspect this invention provides a process for producing a sub-assembly for use in an electro-optic display, the process comprising:

providing a backplane comprising at least one electrode located in a first area of the backplane;

covering a second area of the backplane spaced from the electrode with a masking layer;

coating the backplane having the masking layer thereon with a layer of an electro-optic material; and removing the masking layer, and the portion of the layer of electro-optic medium thereon, from the backplane, thereby producing a sub-assembly comprising the backplane having its first area covered by the layer of electro-optic material but its second area free from the layer of electro-optic material.

This process may hereinafter for convenience be referred to as the "masked backplane" process of the invention. In one form of this process, the second area of the backplane comprises a contact pad intended, in the final display, to make electrical contact with the front electrode of the display. In this form of the invention, a light-transmissive conductive layer may be partially covered with a lamination adhesive, and laminated to the backplane/electro-optic material sub-assembly with the lamination adhesive contacting the electro-optic material and the light-transmissive conductive layer in electrical contact with the contact on the backplane. This electrical contact may be direct, or may be made via an electrically conductive ink or similar deformable conductive material.

In another form of the process, after the layer of electro-optic material has been coated on the backplane, but before the masking layer is removed, a layer of lamination adhesive (preferably a 100 per cent solids radiation-curable adhesive) is coated over the electro-optic material, and then the masking layer is removed, together with both the portions of the layers of electro-optic material and the lamination adhesive thereon. A light-transmissive electrically-conductive layer can then be laminated to the lamination adhesive in the first area of the backplane; the light-transmissive electrically-conductive layer preferably extends into the second area of the backplane so as to make electrical contact with the contact pad in this second area.

In a further form of the process, the backplane has a third area which is covered by a second masking layer which can be removed separately from the (first) masking layer covering the second area. In this form of the process, after the layer of electro-optic material has been coated, the second masking layer is removed, thus exposing the third area of the backplane. A light-transmissive electrically-conductive layer is now coated over the backplane.

In a second aspect, this invention provides a process for spraying capsules of an electrophoretic medium on to a substrate, the process comprising:

forming a dispersion of the capsules in a liquid;

feeding the dispersion through a first orifice; and feeding a continuous stream of gas through a second, annular orifice surrounding the first orifice, thereby forming a spray of the capsules.

This process may hereinafter for convenience be referred to as the "spray coating process" of the present invention. The process may include shaping the spray by feeding a continuous stream of gas through a plurality of shaping orifices disposed adjacent the spray. The spray may be directed on to any type of substrate, including a web, a plurality of discrete objects disposed on a support or one or more three-dimensional (i.e., non-planar) objects. If, as is typically the case, the capsule walls are formed from a hydrophilic material (such as the aforementioned gelatin/acacia coacervate), the liquid used to disperse the capsules is desirably aqueous; depending upon the specific capsules and liquid used, the liquid may optionally comprise any one or more of pH modifiers, surfactants and ionic dopants. The gas passed through both the second orifice and the shaping orifices is typically air, but it some cases it may be useful to use an inert gas, for example nitrogen.

The spray coating process of the present invention may include the use of a masking material covering part of the substrate so that, after removal of the masking material, capsules remain only on those portions of the substrate where the masking material was not present. Such a "masked spray coating process" of the invention may comprise multiple steps with each step involving the use of a different mask and a different capsule dispersion so that the different capsule dispersions are disposed in different areas of the final display.

In a third aspect, this invention provides a process for forming a monolayer of capsules on a substrate, the process comprising:

depositing a solution of a water-swellable polymer on the substrate; and thereafter depositing a quantity of the capsules sufficient to form a monolayer of capsules on to the substrate, and allowing the capsules to arrange themselves into a monolayer on the substrate.

This process may hereinafter for convenience be referred to as the "swellable polymer coating process" of the present invention. The polymer used may be, for example, a polysaccharide, such as a pectin, or a protein, especially an albumin. The albumin used may be, for example, egg albumin or bovine serum albumin; other types of albumin may also be suitable. At least when the capsules are formed of a hydrophilic material (such as the gelatin/acacia coacervate mentioned in many of the E Ink patents and applications mentioned above), the polymer solution is preferably an aqueous solution. The deposition of the capsules is desirably effected by a process such as spray coating which does not require contact of a coating head or coating bar with the capsule layer.

In a fourth aspect, this invention provides a process for forming an electro-optic display, the process comprising:

providing a backplane comprising at least one electrode;
coating the backplane with a layer of an electro-optic material;
depositing a layer of a substantially solvent-free polymerizable liquid material over the layer of electro-optic material;
contacting the polymerizable liquid material with at least one light-transmissive electrically-conductive layer; and
exposing the polymerizable liquid material to conditions effective to cause polymerization of the material, thereby adhering the at least one light-transmissive electrically-conductive layer to the layer of electro-optic material.

This process may hereinafter for convenience be referred to as the "overcoat layer process" of the present invention. In this process, the coating of the backplane with the electro-optic material may be conducted by the masked backplane process of the present invention (to permit masking of any areas, for example row and column electrodes, which should not be covered by electro-optic material) and/or by the spray coating process of the present invention. In one form of the overcoat layer process of the present invention, both a light-transmissive electrically-conductive layer and a color filter array are adhered to the electro-optic layer. Typically, the light-transmissive electrically-conductive layer is mounted on a front substrate, which is provided with a color filter array (which may be printed directly on to the front substrate). The front substrate may serve to provide mechanical support to the electrically-conductive layer; many conductive layers, for example indium-tin-oxide (ITO) layers are too fragile to be self-supporting.

In a second form of the overcoat layer process of the present invention, the electro-optic layer is a color electro-optic layer capable of displaying a variety of colors (a so-called "inherent color" layer), and only a front plane electrode (and any supporting substrate required) are adhered to the electro-optic layer by means of the polymerizable liquid material.

BRIEF DESCRIPTION OF DRAWINGS

FIG. 2A is a schematic section along line 2A-2A in FIG. 1 but showing the backplane after deposition of electro-optic material thereon.

FIG. 2B is a schematic section similar to that of FIG. 2A but showing the backplane after the masking layer has been removed.

FIG. 2C is a schematic cross-section through a sub-assembly comprising a light-transmissive, electrically-conductive layer and a layer of lamination adhesive.

FIG. 2D is a schematic section similar to those of FIGS. 2A and 2B but showing the backplane after lamination to the backplane of the sub-assembly shown in FIG. 2C via the layer of lamination adhesive.

FIG. 3A is a schematic section similar to that of FIG. 2A but showing the same stage in a second masked backplane process of the present invention.

FIG. 3B is a schematic section similar to those of FIGS. 2B and 3A but showing the backplane after formation of a layer of lamination adhesive overlying the electro-optic material but before removal of the masking layer.

FIG. 3C is a schematic section similar to that of FIG. 3B but showing the backplane after removal of the masking layer.

FIG. 3D is a schematic section similar to that of FIGS. 2D and 3C but showing the backplane after lamination of a front electrode and front substrate to the electro-optic material via the layer of lamination adhesive.

FIG. 4A is a schematic section similar to those of FIGS. 2A and 3A but showing the same stage in a third masked backplane process of the present invention which uses two separate masking layers.

FIG. 4B is a schematic section similar to that of FIG. 4A but showing the backplane after removal of the second masking layer.

FIG. 4C is a schematic section similar to those of FIGS. 4A and 4B but showing the backplane after formation of a light-transmissive front electrode layer overlying the electro-optic material.

FIG. 4D is a schematic section similar to those of FIGS. 4A-4C but showing the backplane after removal of the first masking layer.

DETAILED DESCRIPTION

Figure 1:
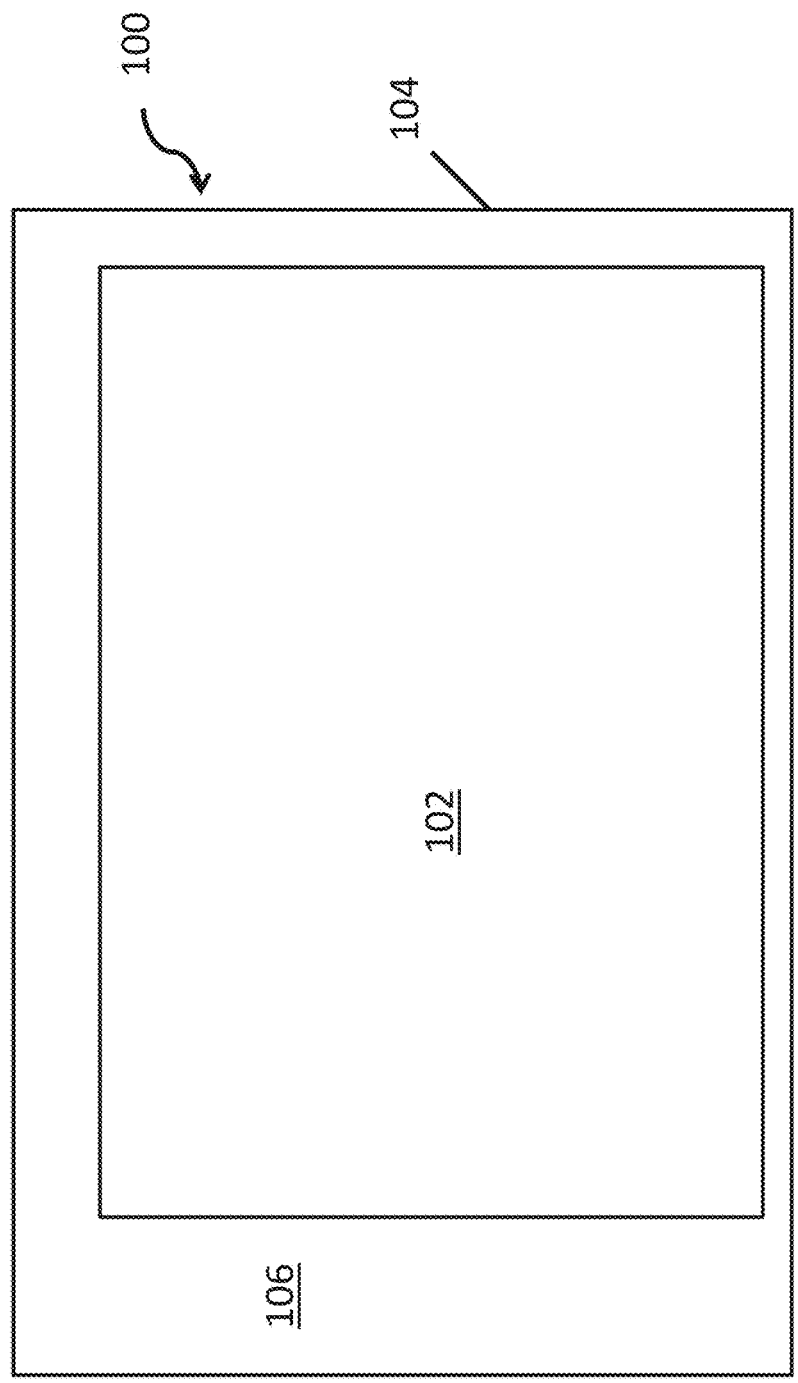
FIG. 1 of the accompanying drawings is a schematic top plan view of a backplane undergoing a first masked backplane process of the present invention.

As already indicated, this invention has several different aspects, which will primarily be described separately below. However, it should be appreciated that a single physical process may make use of more than one aspect of the invention. Thus, for example, a masked backplane process of the invention might make use of the air spray coating process of the invention to deposit electro-optic material on a backplane treated by the swellable coating process of the invention, and the layer of electro-optic material might thereafter be treated by the overcoat layer process of the invention.

Masked Backplane Process

As indicated above, the masked backplane process of the present invention provides a process for producing a sub-assembly for use in an electro-optic display. This process comprises providing a backplane comprising at least one electrode located in a first area of the backplane; covering a second area of the backplane spaced from the electrode with a masking layer; coating the backplane having the masking layer thereon with a layer of an electro-optic material; and removing the masking layer, and the portion of the layer of electro-optic medium thereon, from the backplane, thereby producing a sub-assembly comprising the backplane having its first area covered by the layer of electro-optic material but its second area free from the layer of electro-optic material. Thus, the masked backplane process allows for formation of a sub-assembly, and ultimately an electro-optic display, without the use of a pre-formed front plane laminate and without the presence of a lamination adhesive layer between the electro-optic layer and the backplane, thus reducing or eliminating the problems associated with this lamination adhesive layer, as discussed above.

The masked backplane process of the present invention builds the sub-assembly or display starting from the backplane. The process may be carried out on individual backplanes but for mass production purposes it is more conveniently effected on backplanes arranged in a multi-up configuration. Conceptually, when used to produce a complete display, the masked backplane process may be regarded as involving (a) the backplane itself, which may be a segmented, passive matrix or active matrix backplane; (b) a masking layer for protecting areas of the backplane which are not be covered by the electro-optic material (the protected areas will typically be those required for making a "top plane connection" to the front electrode of the final display, and may also include areas used for conductors leading to the pixel electrodes and electronic components such as row and column drivers); (c) a solid electro-optic medium, typically an encapsulated electrophoretic medium; (d) a light-transmissive, electrically-conductive layer which forms the front electrode of the display; and (e) a means, typically a lamination adhesive, for securing the light-transmissive, electrically-conductive layer to the solid electro-optic medium.

As already indicated, the backplane used in the masked backplane process may be of any known type, although care should be taken to ensure that the backplane used does not damage the electro-optic layer. For example if the electro-optic layer is to be formed from an encapsulated electrophoretic medium, the backplane should not have such sharp changes in level as to risk puncturing some of the capsules. The masking layer may be formed from a simple polymeric film which adheres to the backplane either because of its own physical properties or with the aid of an adhesive coating, but should desirably not be more than about 75 µm in thickness; polymeric films which have been found useful as masking layers include Kapton tape (a polyimide tape available from du Pont de Nemours & Company, Wilmington, Del.) and RP301 film (an acrylic film available form Nitto America, Inc., Fremont Calif.). The solid electro-optic layer is typically an encapsulated electrophoretic layer but may also be a polymer-dispersed electrophoretic layer or a rotating bichromal member or electrochromic layer. Care should be taken to ensure that the physical properties of the electro-optic layer are such that the portions of the layer overlying the masking layer are removed when the masking layer itself is removed, without tearing the masking layer so that portions of the masking layer are left on the backplane and/or without portions of the electro-optic layer in the unmasked portion of the backplane being inadvertently removed. The material used to form the front electrode and the adhesive can be any of the materials used in the prior art for this purpose.

Specific masked backplane processes of the invention will now be described in more detail with reference to FIGS. 1 to 4 of the accompanying drawings. FIG. 1 is a top plan view of an active matrix backplane (generally designated 100) having a first, central area 102 provided with a two dimensional array of pixel electrodes (not shown), and a second, peripheral area 104 covered by a masking film 106. (It will be appreciated that the relative sizes and dispositions of the first and second areas 102 and 104 can vary widely and it is not necessary that the second area 104 surround the first area 102.) The second area 104 will normally include a contact pad for making electrical contact with a front electrode (described below) and may include row and column electrodes connected to the pixel electrodes in the first area 102 and sockets for row and column drivers.

After provision of the masking layer on the backplane, the next step of the masked backplane process is coating the backplane with a layer of electro-optic material 108, as illustrated in FIG. 2A. Any technique capable of depositing the layer of electro-optic material on the backplane may be used to form layer 108; with an encapsulated electrophoretic electro-optic material, slot die coating, bar coating and spray coating methods have all been successfully used to apply the electrophoretic material directly to a masked backplane. Depending upon the deposition method used, the layer of electro-optic material may or may not cover completely both the first and second areas of the backplane; for example, some spray coating methods may only coat part of the masked area.

The next step of the process is removal of the masking layer 106 to expose the second area 104 of the backplane 100, and the electrical connectors and/or sockets thereon, as illustrated in FIG. 2B. As already noted, it is important to choose the masking layer and the electro-optic material such that the masking film and overlying layer of electro-optic material are removed completely from the second area 104 but that no portion of the electro-optic material overlying the first area 102 is removed.

To complete the assembly of an electro-optic display, it is necessary to secure a light-transmissive, electrically conductive layer over the layer of electro-optic material 108. As shown in FIG. 2C, this is most conveniently effected by providing a front substrate 110 carrying the light-transmissive, electrically conductive layer or front electrode layer 112. As discussed for example in the aforementioned U.S. Pat. No. 6,982,178, polymeric films coated with indium tin oxide (ITO) are available commercially and are very suitable for providing the front substrate 110 and front electrode layer 112. A layer of lamination adhesive 114 is then formed on the front electrode layer 112, leaving exposed a portion of the front electrode layer 112 needed to provide an electrical connection to the backplane 100. In practice, it is generally most convenient to coat the whole of the front electrode layer 112 with the lamination adhesive layer 114 using a roll-to-roll process, cut the resultant roll into portions of the size needed for individual displays, and then to remove or "clean" the lamination adhesive from the portion of the front electrode layer 112 required to provide the electrical connection. A variety of methods for cleaning the lamination adhesive from the requisite portion of the front electrode layer 112 are known in the art; see, for example, U.S. Pat. No. 7,733,554.

The sub-assembly shown in FIG. 2C is then laminated to the sub-assembly shown in FIG. 2C with the lamination adhesive layer 114 in contact with the electro-optic layer 108 to form the final display shown in FIG. 2D. Typically, a conductive ink or similar material 116 is placed on the backplane 100 adjacent the portion of the front electrode layer 112 not covered by the adhesive layer 114, as described in the aforementioned U.S. Pat. No. 6,982,178. This final display has the advantage that the electro-optic layer 108 is in direct contact with the backplane 100 (without any intervening adhesive layer), thereby maximizing the resolution of the display. In addition, the positioning of the adhesive layer 114 adjacent the front electrode layer 112 allows the adhesive layer 114 to be made highly conductive without detriment to the resolution of the display.

FIGS. 3A-3D illustrate a second masked backplane process of the invention in which an adhesive layer is formed overlying the electro-optic layer before the masking layer is removed. The first stages of this second process, namely the provision of a masking layer 106 on a backplane 100 and the deposition of an electro-optic layer 108 over the backplane, are identical to the first process described above, and result in the sub-assembly shown in FIG. 3A, which is essentially identical to that shown in FIG. 2A. However, the next step in the second process is the coating of a 100 per cent solids radiation-curable adhesive layer 214 over the electro-optic layer 108, to produce the structure shown in FIG. 3B. The adhesive layer 214 is left uncured at this step of the process. The masking layer 106 is next removed, as shown in FIG. 3C, thereby removing the portions of both the electro-optic layer 108 and the adhesive layer 214 previously overlying the masking layer 106. Again, it is important to choose the masking layer, the electro-optic material and the adhesive such that the masking film and overlying layers of electro-optic material and adhesive are removed completely from the second area 104 but that no portion of the electro-optic material overlying the first area 102 is removed.

The final step in the second process is the lamination of a film comprising a front substrate 110 and front electrode layer 112 to the sub-assembly shown in FIG. 3C to produce the final display shown in FIG. 3D, with the provision of conductive ink 116 or similar conductive material as described above with reference to FIG. 2D. Since the radiation-curable adhesive layer 214 is already present in the sub-assembly of FIG. 3C, no further adhesive is needed and the front substrate 110 and front electrode layer 112 can be laminated at substantially room temperature and without the use of high pressure. The use of the 100% solids adhesive layer 214 allows the front electrode layer 112 and front substrate 110 to take a variety of forms including flexible substrates and also rigid substrates like glass. Once the front electrode layer 112 and front substrate 110 have been applied, the adhesive layer 214 can be radiation cured with ultraviolet radiation to produce the final display shown in FIG. 3D. This display, like that shown in FIG. 2D, has the advantage that the electro-optic layer 108 is in direct contact with the backplane 100 to maximize the resolution of the display. In addition, the positioning of the adhesive layer 214 adjacent the front electrode layer 112 allows the adhesive layer 214 to be made highly conductive without detriment to the resolution of the display. The process of FIGS. 3A-3D eliminates the top plane cleaning used in the process of FIGS. 2A-2D, allows for a thinner adhesive layer because this layer is applied as a liquid, allows for flexible or rigid front electrode layers and eliminates the need for a high temperature lamination step.

Figure 5:
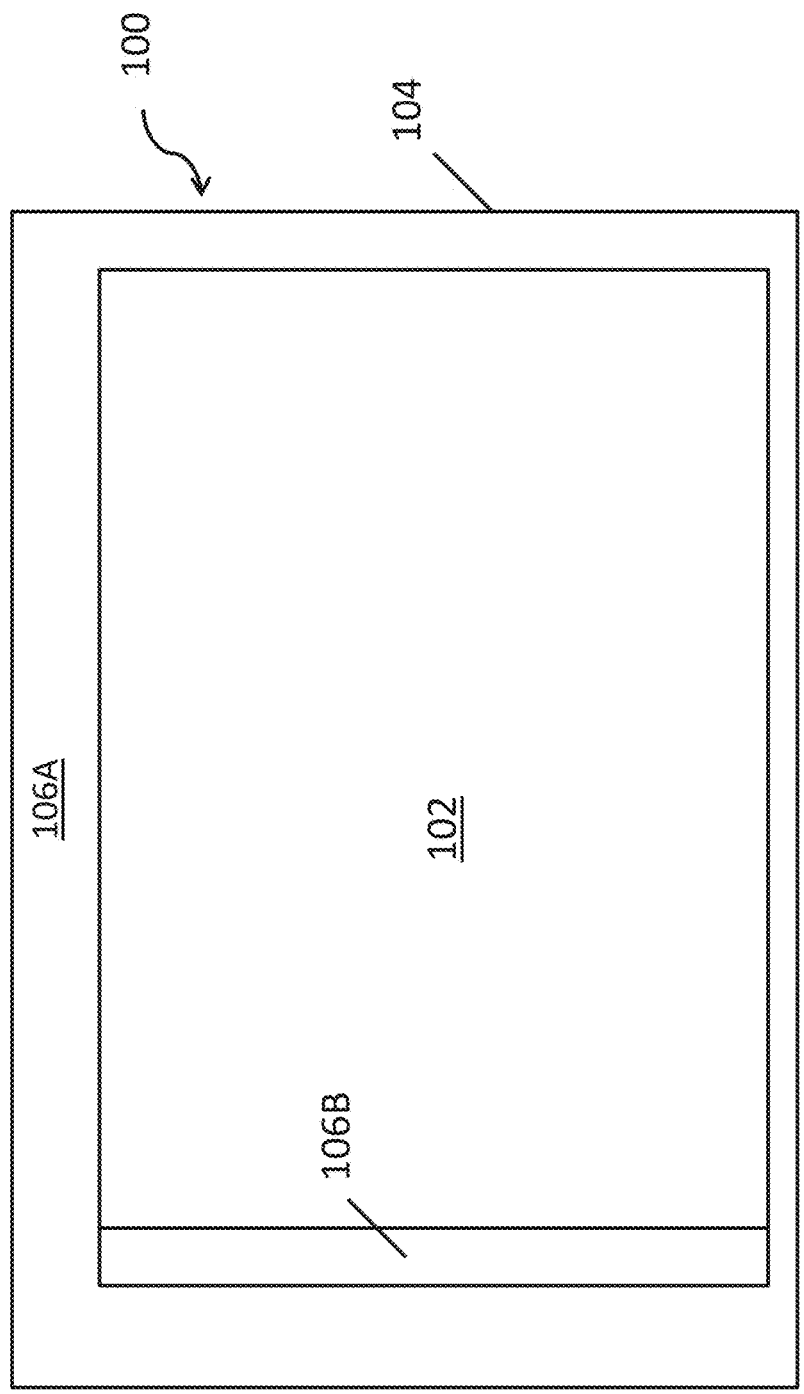
FIG. 5 is a schematic top plan view, similar to that of FIG. 1, of the backplane used in the third masked backplane process after application of the two masking layers but before deposition of the electro-optic layer.

FIGS. 4A-4D illustrate a third masked backplane process of the invention in which two separate masking layers are used and a front electrode layer is formed directly on the electro-optic layer. The first stages of this third process, namely the provision of two separate masking layers 106A and 106B on a backplane 100 and the deposition of an electro-optic layer 108 over the backplane, are generally similar to the first and second processes described above, and result in the sub-assembly shown in FIG. 4A, which is generally similar to those shown in FIGS. 2A and 3A except for the provision of the two separate masking layers 106A and 106B. Masking layer 106A covers the bonding areas for the driver electronics and edge seal areas, while masking layer 106B covers the area for front electrode connection(s). The two masking layers do not have to be separate films but can be in the form of a single film cut to allow two portions thereof to be removed separately, as illustrated schematically in FIG. 5. Alternatively, depending upon the geometry of the areas covered by the first and second masking films, the first masking film may cover all areas of the backplane which are not to have electro-optic material deposited thereon, and the second masking film may be a separate film applied over the first masking film. The masking films previously described can be used. The masked backplane shown in FIG. 5 then has electro-optic material deposited thereon by any of the methods previously described to produce the structure shown in FIG. 4A.

The next step in the second process is removal of the second masking layer 106B without removing the first masking layer 106A, thus exposing the areas of the backplane needed for front electrode contacts, and producing the structure shown in FIG. 4B. Next, a light-transmissive, electrically-conductive front electrode layer 312 is deposited (normally by a wet coating process) over the backplane to produce the structure shown in FIG. 4C. The front electrode layer 312 not only forms a front electrode over the electro-optic layer 108 but also forms a front electrode connection with the exposed areas of the backplane, as illustrated at the right hand side of FIG. 4C. The front electrode layer 312 may be formed from a conductive polymer, for example poly(3,4-ethylenedioxythiophene) ("PEDOT"), normally used in the form of its poly(styrenesulfonate) salt ("PEDOT: PSS") or a polyaniline, or may be formed from network of conductors, for example carbon nanotubes or nanowires. The present inventors have successfully coated both PEDOT and carbon nanotube front electrodes directly on an encapsulated electrophoretic layer.

The final step of the process is removal of the first masking layer 106A, together with the overlying portions of the electro-optic layer 108 and the front conductor layer 312 to produce the display illustrated in FIG. 4D. If desired driver electronics and/or edge seals may now be placed in the exposed areas of the backplane.

The display shown in FIG. 4D, like those shown in FIGS. 2D and 3D, has the advantage that the electro-optic layer is in direct contact with the backplane, thus maximizing the resolution of the display. However, in contrast to the displays described above, the display shown in FIG. 4D has no lamination adhesive between its electrodes, thus completely eliminating the electrical effect of such adhesive. Thus, the display structure shown in FIG. 4D enables the highest resolution and temperature performance for a given electro-optic layer. One potential practical problem with the display structure shown in FIG. 4D is that any pore or pinhole in the electro-optic layer would allow the coated front electrode to come into electrical contact with the pixel electrodes on the backplane, thus shorting the display.

From the foregoing, it will be seen that the masked backplane process of the present invention can provide high resolution addressing without compromising temperature performance, thus removing the limitations imposed by prior art display construction methods which require a thin adhesive between the electro-optic layer and the backplane. Additionally the masked backplane process opens up the possibility of conducting the entire manufacturing process in a single fab.

Spray Coating Process

As already mentioned, this invention also provides a process for spraying capsules of an electrophoretic medium on to a substrate. This process comprises forming a dispersion of the capsules in a liquid; feeding the dispersion through a first orifice; and feeding a continuous stream of gas through a second, annular orifice surrounding the first orifice, thereby forming a spray of the capsules. This spray coating process has the advantage over slot coating that spray coating normally does not require the use of rheology modifiers in the liquid being sprayed, so that the final coating is free from such rheology modifiers and hence free from the effects such rheology modifiers may have upon the properties of slot coated electrophoretic media. Typically, in spray coating, only the additives actually needed in the final product need be added to the liquid being sprayed.

Figure 6:
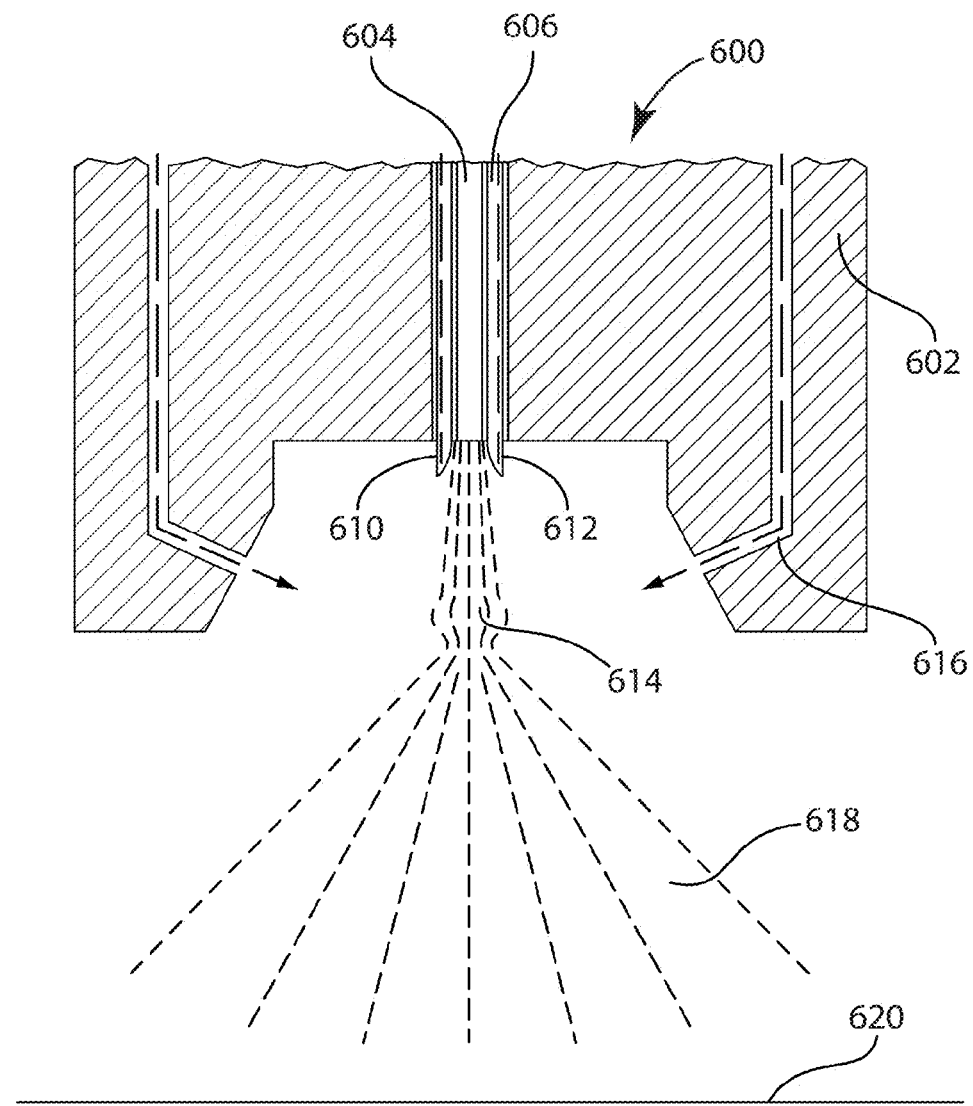
FIG. 6 is a schematic cross-section through a simple spray coating nozzle used in the spray coating process of the present invention.

FIG. 6 is a schematic cross-section through a simple spray coating nozzle (generally designated 600) which may be used in the spray coating process of the present invention. The nozzle 600 comprises a substantially cylindrical body 602 having a central, axial bore 604 through which is pumped electrophoretic capsules (not shown) dispersed in a liquid (also not shown). The central bore 604 is surrounded by an annular bore 606, through which is forced a continuous stream of air. The lower end of the central bore 604 terminates in an orifice 608, which the lower end of the annular bore 606 terminates in an annular orifice 610, which surrounds orifice 608. A cylindrical baffle 612 surrounds the annular orifice 610. The air flow through the annular orifice 610 constrained by the baffle 612 causes the dispersion of capsules passing through orifice 608 to form a spray or jet 614.

The nozzle 600 is also provided with shaping air bores 616, which may be six or eight in number. As shown in FIG. 6, the peripheral portions of the nozzle 600, through which the bores 616 pass, extend downwardly below the orifices 608 and 610 and the baffle 612, and the lower portions of the bores 616 are directly downwardly and inwardly. Shaping air is forced continuously through the bores 616 so that it impinges on the jet 614, thereby causing the jet to open out into a wide spray 618, which impinges on a substrate 620 disposed below the nozzle 600.

Figure 7:
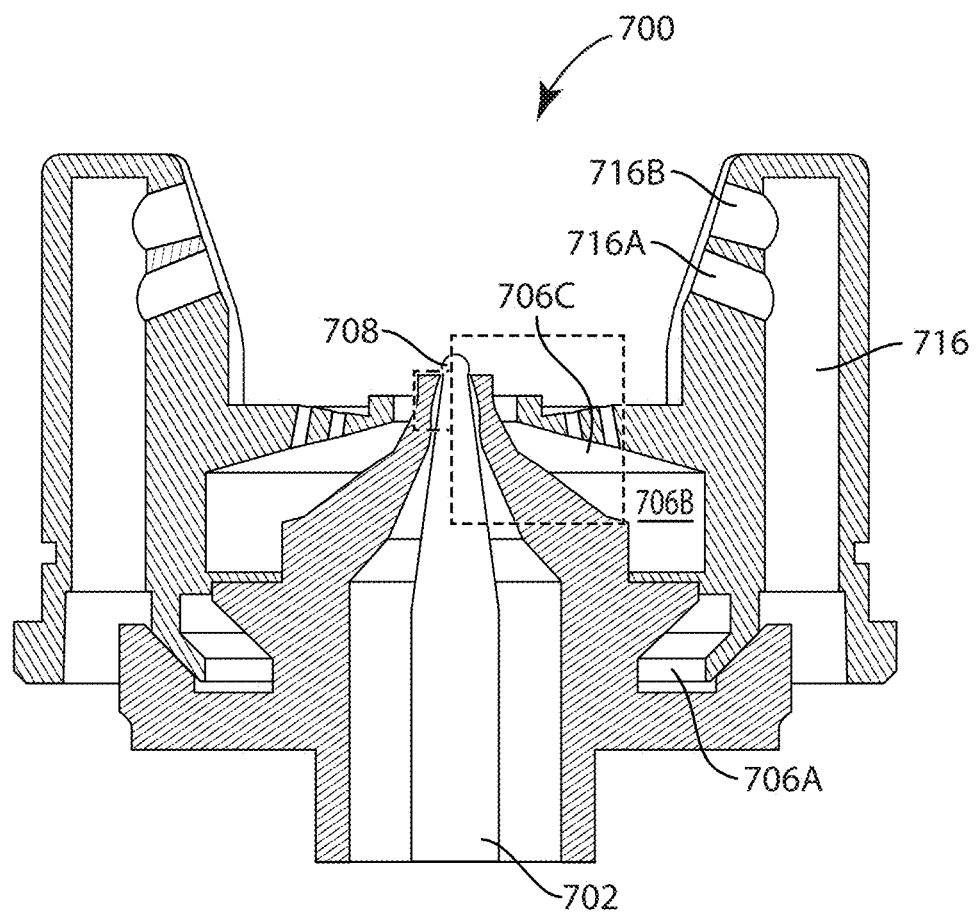
FIG. 7 is a cross-section through a more complex spray coating nozzle used in the spray coating process of the present invention.
Figure 8:
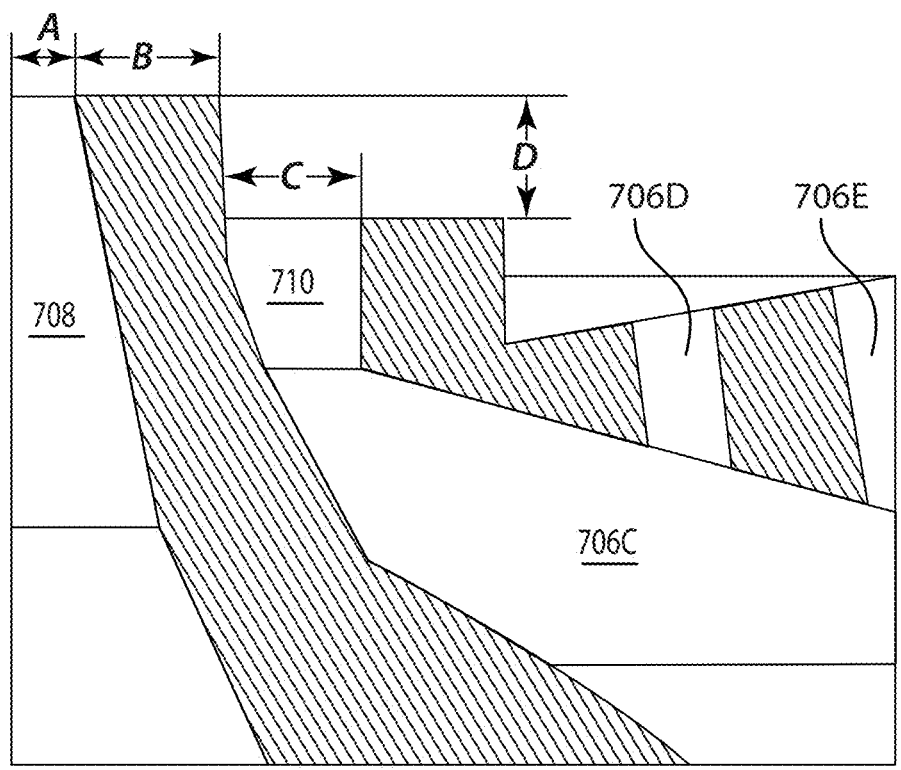
FIG. 8 is an enlarged view of the portion of the nozzle lying within the dotted box in FIG. 7.

FIGS. 7 and 8 illustrate a high-volume low-pressure atomization nozzle (generally designated 700) suitable for use in a high volume spray coating process of the present invention. It will be appreciated that in use the nozzle 700 would normally be inverted relative to the position illustrated in FIGS. 7 and 8 so that capsules emerging from the nozzle would be directed downwardly on to a substrate, as illustrated in FIG. 6.

As will readily be apparent to those familiar with spray nozzle technology, the nozzle 700 shown in FIGS. 7 and 8 operates in substantially the same manner as the nozzle 600 shown in FIG. 6 but the nozzle 700 has the following structural differences:

(a) the central axial bore 702, through which the capsule dispersion passes, tapers adjacent its orifice 708 to increase the velocity at which the capsule dispersion passes through this orifice;

(b) the simple annular bore 606 in FIG. 6 is replaced by a combination of air feed passage 706A, a cylindrical air plenum 706B, a conical tapering portion 706C and an outlet portion 706D (FIG. 8) which terminates in an annular orifice 710; in addition, auxiliary shaping air jets are provided by bores 706E which extend from the tapering portion 706C to orifices on either side of the orifice 708; and (c) the shaping air bores 716 are provided with double outlet portions 716A, 716B to provide greater control of the shape of the final capsule spray.

FIG. 8 shows four dimensions which have been found important in achieving good spray coating results from the nozzle 700 shown in FIGS. 7 and 8, these four dimensions being (A) the radius of the central orifice 708; (B) the radial distance between the outer edge of the central orifice 708 and the inner edge of the annular orifice 706D; (C) the radial width of the annular orifice 706D; and (D) the axial distance between the orifices 708 and 710.

The quality of capsules coatings is assessed in terms of their reproducibility granularity, mean coating weight, uniformity and defect density; defect density is quantified by the number of non-switching capsules per unit display area in a standard display structure, which for present purposes is defined as a backplane bearing, in order, a 25 µm layer of lamination adhesive, a 20 µm capsule layer and a front substrate comprising an ITO layer on 25 µm polyethylene terephthalate film. The first factor to be considered in achieving good spray coatings is capsule and gas flow rates and pressures. It has been found empirically that capsule spraying is best achieved using a high-volume, low-pressure ("HVLP") nozzle; a variety of standard nozzle designs known in the art may be used, but the preferred design is that shown in FIGS. 7 and 8. Preferably, the ratio of atomization air outlet cross-section to capsule dispersion outlet cross section is not greater than about 8.5, and preferably between about 5.0 and about 7.0. The capsule dispersion orifice diameter (twice A in FIG. 8) is preferably in the range of about 1.0-1.40 mm. The capsule dispersion may contain capsules in a weight fraction preferably between about 38.0 and about 40.5 weight per cent; this dispersion may optionally contain 1-butanol at a concentration of up to about 4.0 weight per cent and a surfactant, such as Triton X-100 at a concentration of up to about 0.04 weight per cent.

A wide range of capsule dispersion feed rates and atomization air feed rates can be used in the spray coating process of the present invention. Typically, the capsule dispersion feed rate, $M_F$, is not less than about 30 g/min and not greater than about 70 g/min, the optimum being determined mainly on the basis of an appropriate residence time in the atomization zone, that is to say the region in which the capsule dispersion column emerging from the first orifice breaks into sheets of fluid, which subsequently break into ligaments and finally droplets. Desirably, the droplet size distribution is such that the mean capsule count per droplet is less than about 5.0, and the standard deviation is less than about 3.0, capsules per droplet. The atomization air feed rate is set on the basis of a critical air velocity, v*, measured at the second orifice, and is typically of the order of about 100 m/sec. In the preferred process, a total air feed rate, $M_A$, (including atomization air and shaping air) of approximately 150 to 200 g/min is employed in the absence of shaping air, and up to 300 g/min with shaping air.

Figure 9:
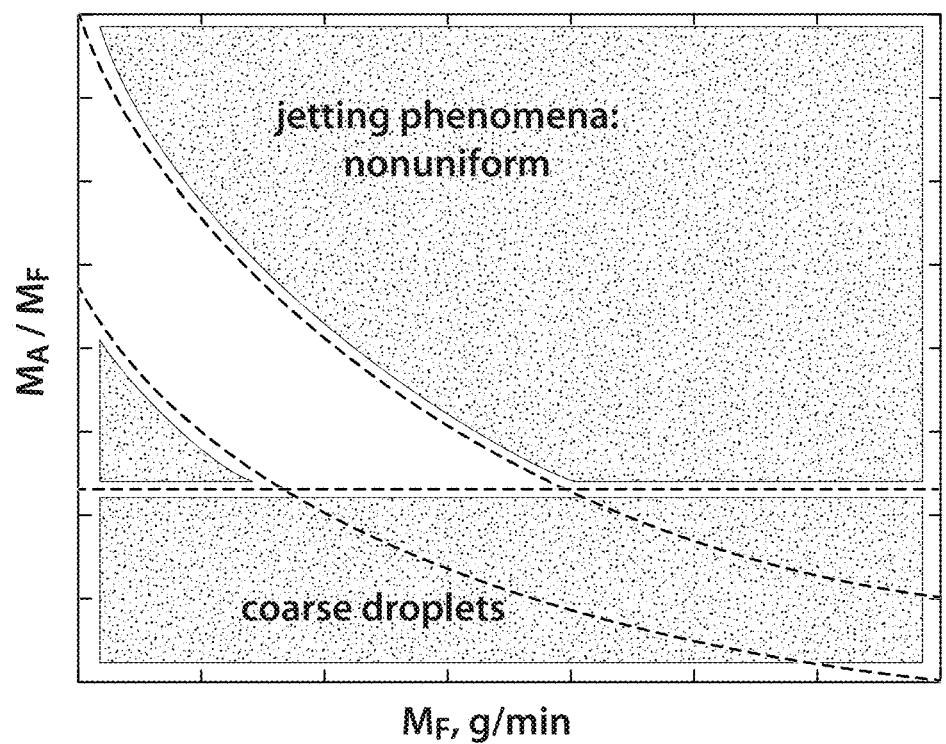
FIG. 9 is a graph illustrating preferred parameters used in the spray coating process of the present invention.

Empirically, it has been found that the operating window for HVLP atomization in terms of $M_A/M_F$ versus $M_F$, has the form shown in FIG. 9, although the numerical values involved will vary with the particular nozzle design used. The unshaded region of the graph of FIG. 9 represents the desirable operating window. The shaded regions represent defect regions which result in undesirable spray patterns such as excessive fluid velocity ("jetting"), highly irregular and transient spray structure, and coarse droplet distribution.

In the spray coating process of the present invention, the air feed rate and nozzle-to-substrate distance should be carefully controlled to avoid capsule damage. In general, a nozzle-to-substrate distance of 200 to 320 mm is optimal, and this distance should be adjusted approximately inversely to atomization air velocity squared.

It has also been found that the quality and uniformity of the sprayed capsule coating can be strongly influenced by pretreatment of the substrate and by additives added to the capsule dispersion. Useful pretreatments and additives include but are not limited to:

1) Capsule dispersions that incorporate surfactants such as Triton X-100, butanol etc. to improve wetting of the substrate surface;

2) Pre-coating of the substrate surface with sub-layers incorporating surfactants such as Triton X-100, 1-butanol, and others possessing a detergent structure, and optionally a polyurethane latex;

3) Pre-treating the substrate with an atmospheric plasma or corona discharge treatment; and 4) The capsule dispersion may contain polymeric binders, for example a polyurethane latex Example 1

A capsule dispersion was sprayed with an HVLP nozzle using inlet atomization air at a pressure of 20 psig (about 330 MNw m$^{-2}$) measured at the nozzle inlet, with a gravity feed of the capsule dispersion. Depending on the dispersion viscosity, the mass flow rate of the dispersion was approximately 25 to 35 g/min. The spray was directed vertically downward and deposition took place at near normal incidence on to a horizontal substrate so as to avoid inclined plane flow after deposition. The nozzle-to-substrate distance was 240 to 280 mm, but may be lower or higher. Capsule spraying took plane across a thin film transistor backplane in one or more passes to achieve a target mean coating weight given by the following relationship:

$$\Theta = M_F \frac{\eta}{Wv} Nm \frac{dv}{dt} = F^B + F^H + F^P$$

where $\Theta$ is the mean coating weight (in g/m$^2$), $M_F$ is the dispersion mass feed rate (in g/min), N is the number of passes over the substrate, $\eta$ is the spray transfer efficiency at each pass (which should be at least 50%), W is the substrate width (in meters), v is the actuation velocity (in m/min). In one process of the invention, the target mean coat weight $\Theta$=20-d, $M_F$=35 g/min, $\eta$~60-70%, and W=0.107 m. In this process, multiple coating passes could be used so long as the total residence time of a given substrate underneath the nozzle did not exceed about 3 or 4 seconds; longer coating times left the thin sub-layers ineffective by evaporation.

As already mentioned, the spray coating process of the invention may include the use of a masking material covering part of the substrate so that, after removal of the masking material, capsules remain only on those portions of the substrate where the masking material was not present. The masking material used to cover part of the substrate should not be porous, or at least should have low enough porosity to ensure that capsule deposition on to the masked areas of the substrate does not occur. The masking material should not significantly absorb the liquid (usually aqueous) in which the capsules are dispersed, and should be placed close enough to the surface of the substrate that lateral draft of capsules beneath the masking material from the unmasked regions of the substrate into the masked areas does not occur. After the capsules have been deposited on the substrate, the capsules may be dried (or otherwise treated to form a coherent layer, for example by exposure to radiation) with the masking material still in position, or the masking material may first be removed and then the capsules dried or otherwise treated. In either case, the physical properties of the masking material and the capsule dispersion should be chosen so that, during the removal of the masking material, capsules are not dragged into previously masked areas of the substrate, nor are capsules removed from unmasked areas (for example, by irregular tearing of a coherent dried layer of capsules.

The masking film may comprise an adhesive pre-laminated on to the surface on to which the capsules are to be deposited, and a release film exposed to the spray. After capsule deposition, the release film is removed, followed by additional processing. The resultant spray-printed film may then be laminated to a backplane, which may be either transparent or opaque.

Figure 10:
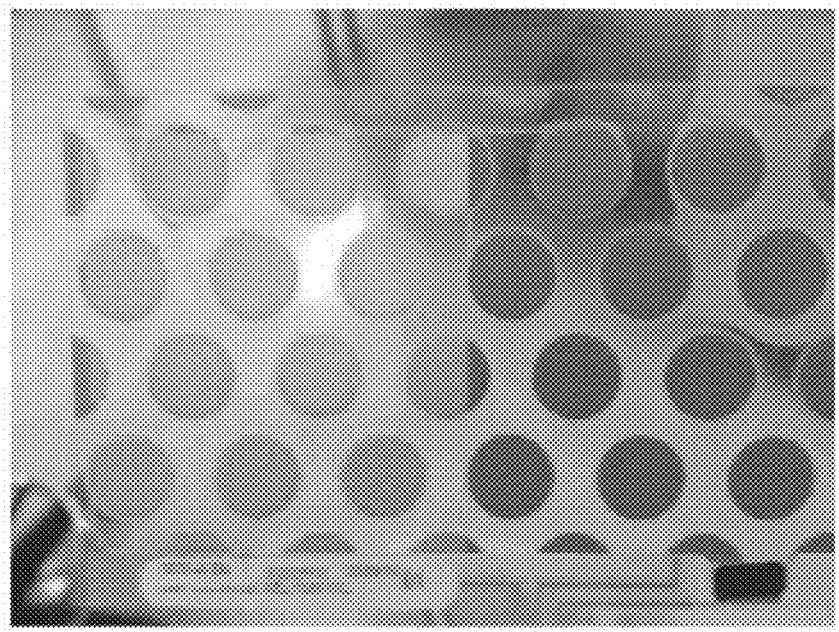
FIG. 10 is a top plan view of a first electrophoretic display produced by a masked spray coating process of the present invention.

FIG. 10 is a top plan view of a first electrophoretic produced by a masked spray coating process of the invention. The backplane is made transparent to allow visibility through the display outside of the areas (circles in FIG. 10) on which the capsules have been deposited. Such a backplane can generate a patterned image with as many individual optical states as the electrophoretic medium is capable of generating. In the display shown in FIG. 10, the capsules contain a white and a magenta pigment, so that all possible states of the display are a combination of magenta and/or white, including the extreme magenta and white optical states.

Figure 11:
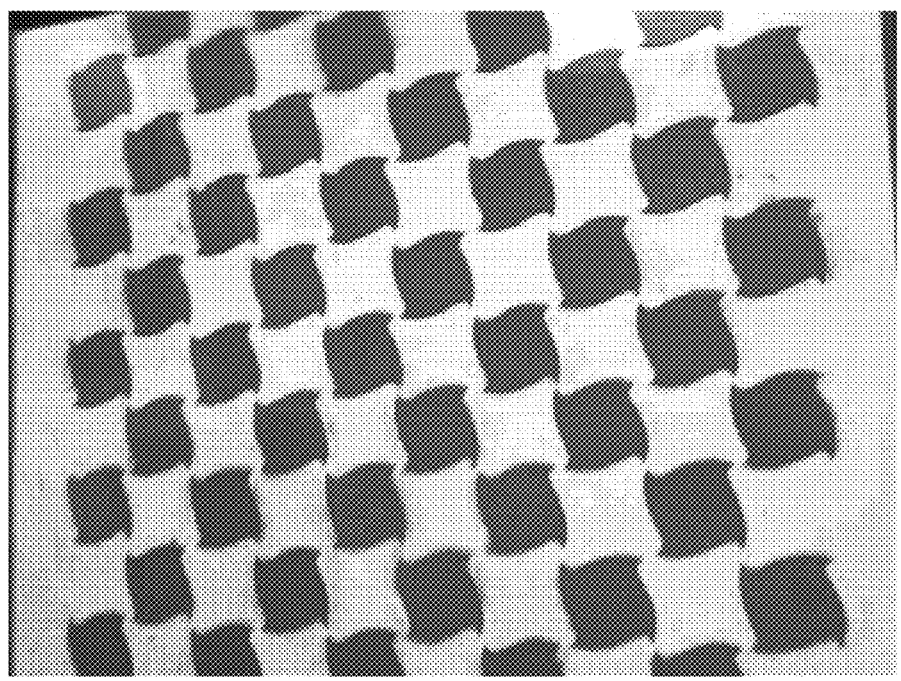
FIG. 11 is a top plan view of a second electrophoretic display produced by a masked spray coating process of the present invention.
Figure 12A:
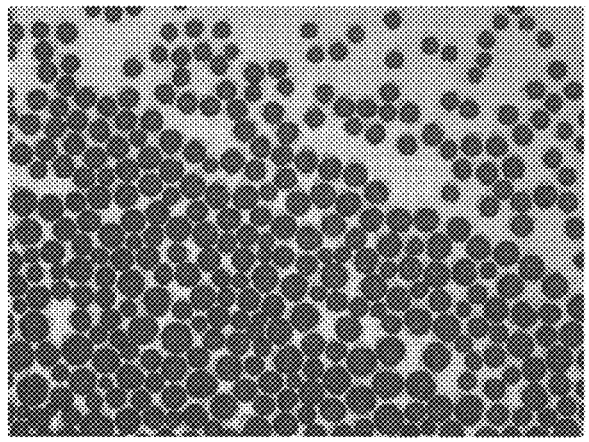
FIGS. 12A-12H are time lapse micrographs showing an experimental demonstration of the swellable polymer coating process of the present invention using capsules deposited from a pipette on to a microscope slide.
Figure 12B:
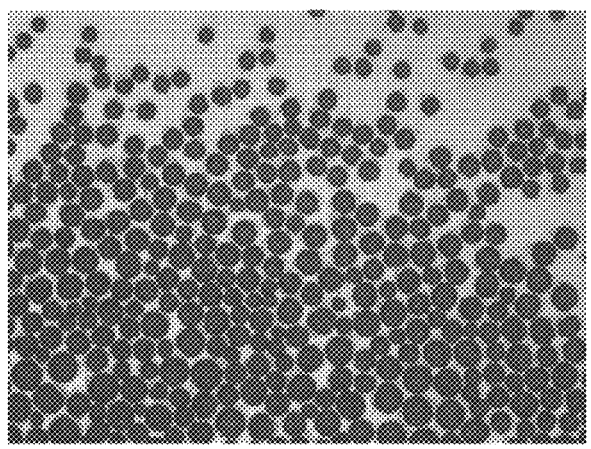
Figure 12C:
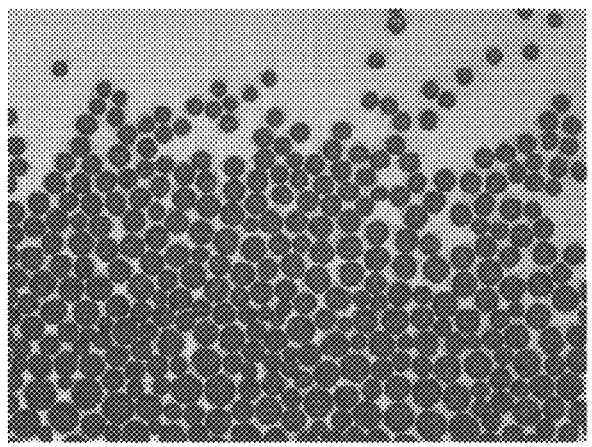
Figure 12D:
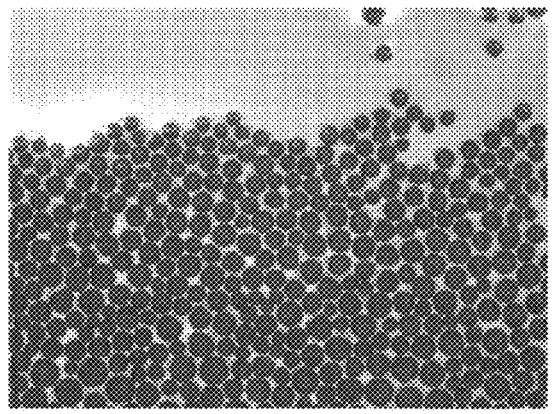
Figure 12E:
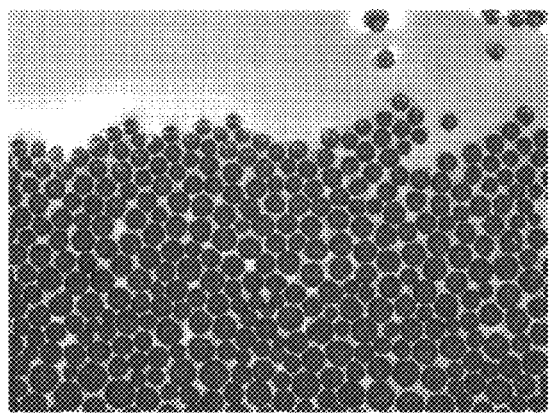
Figure 12F:
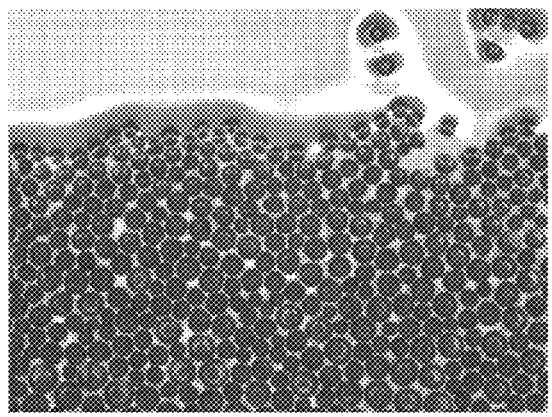
Figure 12G:
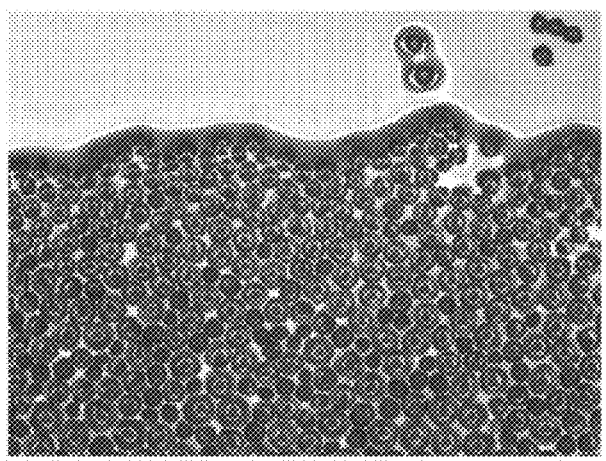
Figure 12H:
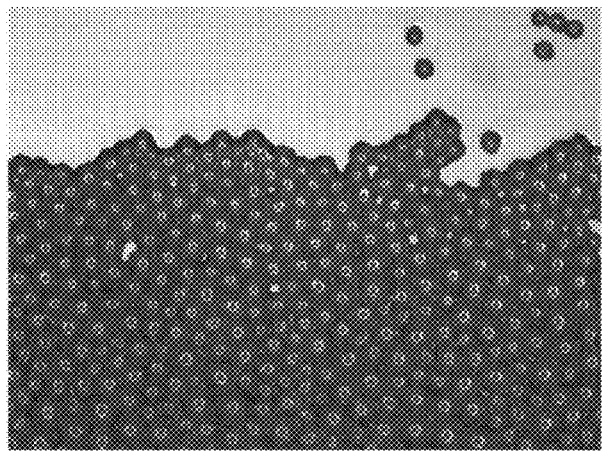

As already mentioned, the masked spray coating process of the invention may comprise more than one coating step and thus allow deposition of two or more different electrophoretic media on a single substrate. FIG. 11 is a top plan view of a display produced in this manner. The display shown in FIG. 11 is produced by applying a first masking material to a front plane electrode, and then spray coating electrophoretic capsules containing blue and white pigments over the first masking material. After drying the capsules and removing the first masking material, a second masking material is applied to the front electrode, and electrophoretic capsules containing yellow and white pigments are spray coated on to the electrode. The second masking material is then removed and the front electrode and overlying electrophoretic layer laminated to a backplane. The display shown in FIG. 11 has two primary optical states, namely a uniform color determined by the common pigment (in this case, white) and a second patterned (blue/yellow) state as illustrated in FIG. 11.

The spray coating process of the present invention overcomes the limitation of prior art coating processes such as slot coating and thus provides the ability to do patch coating and coating of three dimensional objects. The spray coating process is also less susceptible to streaking due to clogging of the die in slot coating processes, and thus can offer enhanced yields. The spray coating process also avoids the need for lamination adhesive layers between the electrodes of a display, thus permitting a higher electric field across the electrophoretic layer for a given operating voltage and thus enabling higher white state brightness and higher contrast ratio, as well as the potential for reduced blooming and enhanced microcontrast as a result of the electrophoretic capsules being in direct contact with the backplane.

Printed encapsulated electrophoretic displays are desirable in applications such as window screens, wall panels, or other architectural elements in which either a low information density display or artistic relief is desired with minimal or no active matrix driving. Instead, the interfaces between switching and non-switching, or between two regions of differing electrophoretic medium which switch in a qualitatively different manner, may be pre-patterned into the display. The masked spray coating process of the present invention provides a way of achieving these aims without compromising the mechanical integrity of the deposited capsules.

Swellable Polymer Coating Process

As already mentioned, this invention provides a process for forming a monolayer of capsules on a substrate, the process comprising depositing a solution of a water swellable polymer on the substrate; and thereafter depositing a quantity of the capsules sufficient to form a monolayer of capsules on to the substrate, and allowing the capsules to arrange themselves into a monolayer on the substrate.

In this process, it is important to control the quantity of capsules deposited on each unit area of the substrate; this quantity should be controlled so that the capsules can rearrange on the substrate into a tightly packed monolayer. The rearrangement of capsules may take place immediately after the deposition of the capsules on the substrate but, perhaps more commonly, may take place after the capsule layer is dried or otherwise treated to form a coherent layer of capsules on the substrate. As previously noted, it is desirable that the deposition of the capsules be effected by a process such as spray coating (or alternatively curtain coating or deposition of capsules from nozzles or similar processes) which do not require contact of a coating head or bar with the capsule layer. With the swellable polymer reducing adhesion of the capsules to the substrate, a coating head or bar will tend to drag the capsules along with it, thus resulting in a very sparse capsule coating on the substrate, too sparse to enable a well packed monolayer of capsules to be formed. If coating is attempted without the swellable polymer pre-treatment, the capsules stick to the substrate as they are deposited by a coating head or bar, but the adhesion of the capsules to the substrate is so great that capillary forces are insufficient to allow for capsule rearrangement and the formation of a well packed monolayer of capsules.

FIGS. 12A to 12H of the accompanying drawings illustrate successive stages of an experimental process of the present invention in which a microscope slide was treated with egg albumen and then had capsules deposited thereon from a pipette. It will be seen from these Figures that the originally scattered capsules deposited from the pipette were gradually drawn by capillary forces into a closely packed monolayer covering about three-fourths of the area of the slide shown in the Figures. When a similar experiment was attempted with bar coating on an albumin-treated slide, the capsules simply clung to the coating bar and virtually no capsules were left behind on the slide. When covering much larger areas than a microscope slide, the albumin coating process of the present invention renders it possible to generate large area of closely packed monolayers of capsules.

From the foregoing, it will be seen that the swellable polymer coating process of the present invention provides a process for generating large quantities of closely packed capsule monolayer coatings using conventional equipment and materials suitable for mass production. The process should produce coatings essentially free from grain, especially if the capsules are applied by spray coating, as the spray should randomize the size distribution of capsules over the coating area. The swellable polymer coating process may be especially useful in providing coatings for use in variable transmission windows, where multilayers of coatings and coating defects (uncoated areas) are highly visible and adversely affect the quality of the windows.

Overcoat Layer Process

As already mentioned, the overcoat layer process of this invention comprises: providing a backplane comprising at least one electrode; coating the backplane with a layer of an electro-optic material; depositing a layer of a substantially solvent-free polymerizable liquid material over the layer of electro-optic material; contacting the polymerizable liquid material with at least one light-transmissive electrically-conductive layer; and exposing the polymerizable liquid material to conditions effective to cause polymerization of the material, thereby adhering the at least one light-transmissive electrically-conductive layer to the layer of electro-optic material.

Figure 13:
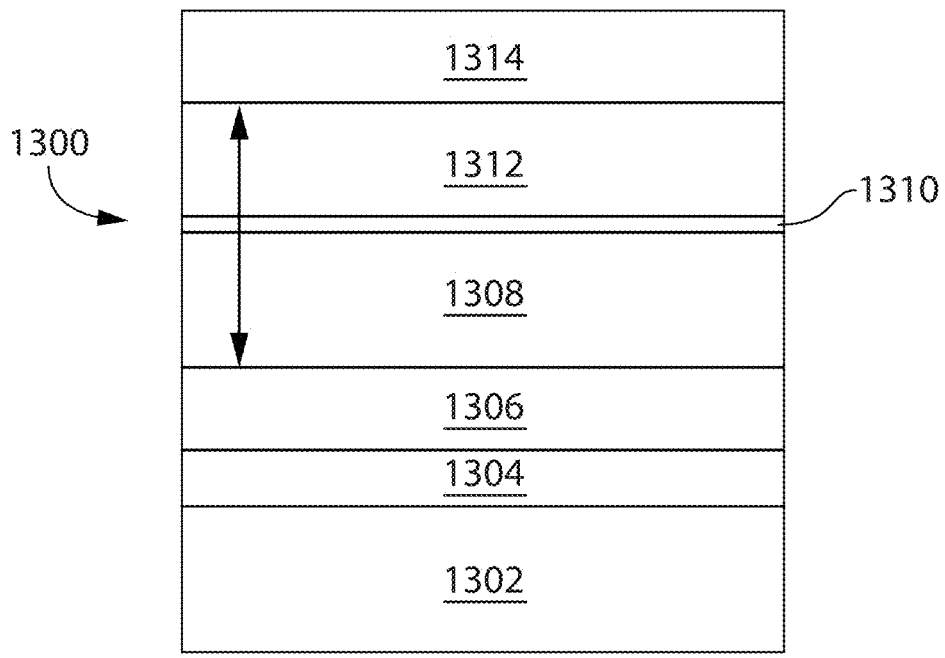
FIG. 13 is a schematic cross-section through a prior art color display using a color filter array and produced using a double release film as previously described.
Figure 14:
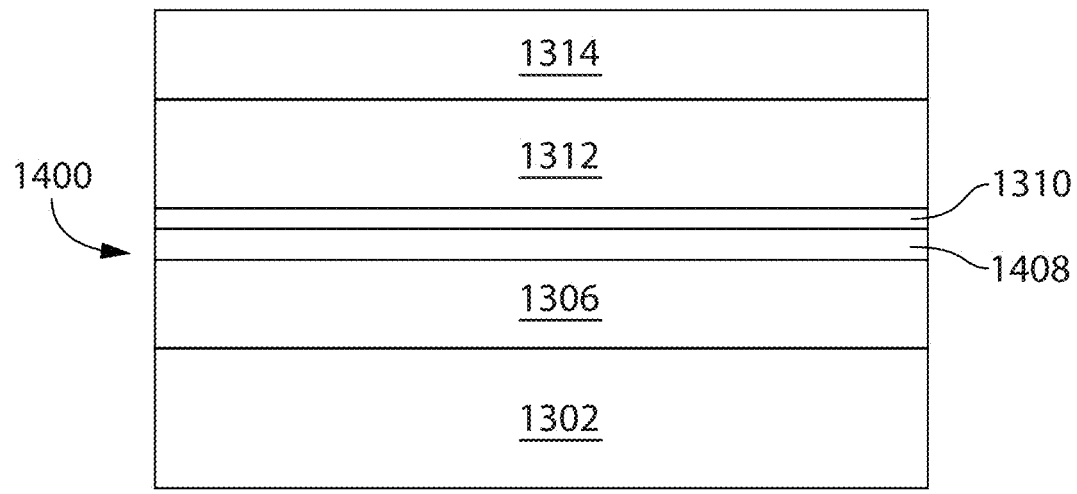
FIG. 14 is a schematic cross-section similar to that of FIG. 13 but taken through a color display produced by the overcoat layer process of the present invention.

The advantages of the overcoat layer process of the present invention may be seen by comparing FIGS. 13 and 14. FIG. 13 shows a schematic cross-section through a prior art color display (generally designated 1300) comprising, in order, a backplane 1302, a first (relatively thin) adhesive layer 1304, a monochrome electro-optic layer 1306, a second adhesive layer 1308 substantially thicker than the first adhesive layer 1304, a front electrode layer 1310, a front substrate 1312 and a color filter array 1314, which may be printed directly on to the front substrate 1312. This structure may be formed using a double release film in the manner described above. Note that in the display 1300 the CFA 1314 is separated from the electro-optic layer 1306 by the thicknesses of the front substrate 1312 and the second adhesive layer 1308, which together are typically about 50 µm thick. (The front electrode layer 1310 is typically less than 1 µm thick and thus for practical purposes its thickness may be ignored.)

FIG. 14 is a schematic cross-section, similar to that of FIG. 13, but taken through a display (generally designated 1400) produced by the overcoat layer process of the present invention. The backplane 1302, electro-optic layer 1306, front electrode layer 1310, front substrate 1312 and CFA 1314 are all similar to the corresponding layers in the prior art display 1300 shown in FIG. 13. However, in FIG. 14 the electro-optic layer 1306 is coated directly on to the backplane 1302 so that the first adhesive layer 1304 present in the display 1300 is eliminated. Furthermore, the second adhesive layer 1308 in display 1300 is replaced in display 1400 by a much thinner adhesive layer 1408 formed by polymerization of a solvent-free polymerizable liquid material. The adhesive layer 1408 will typically have a thickness of only about 5 µm, thus reducing the spacing between the CFA 1314 and the electro-optic layer 1306 to about 30 µm, a 40 per cent reduction from the spacing in display 1300, with a corresponding reduction in both illumination and viewing parallax, thus providing a wider viewing angle and higher color saturation. In addition, the elimination from display 1400 of the first adhesive layer 1304 in display 1300 increases the voltage drop across the electro-optic layer and reduces blooming. The overcoat layer process of the present invention may also be applied to black-and-white displays having a structure similar to that of display 1400 but lacking the CFA 1314.

Figure 15:
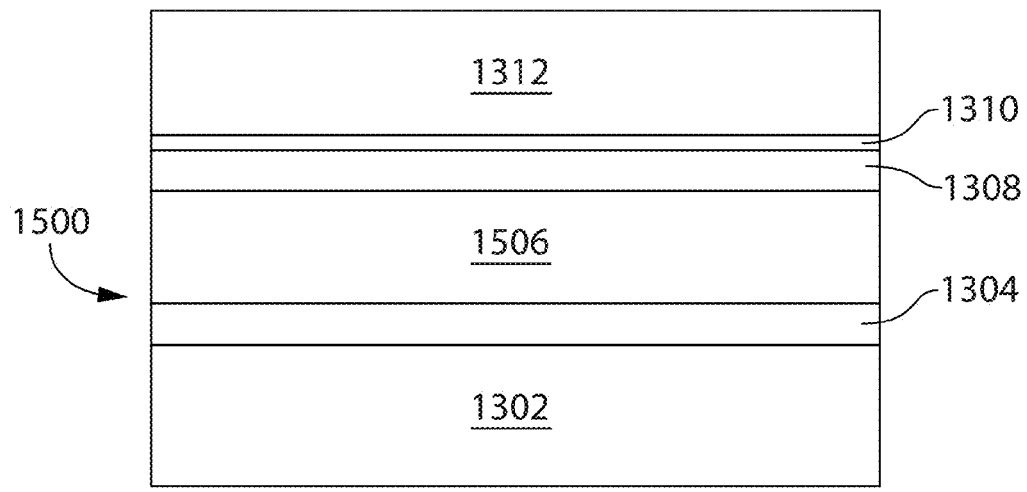
FIG. 15 is a schematic cross-section similar to those of FIGS. 13 and 14 through a prior art inherent color display.
Figure 16:
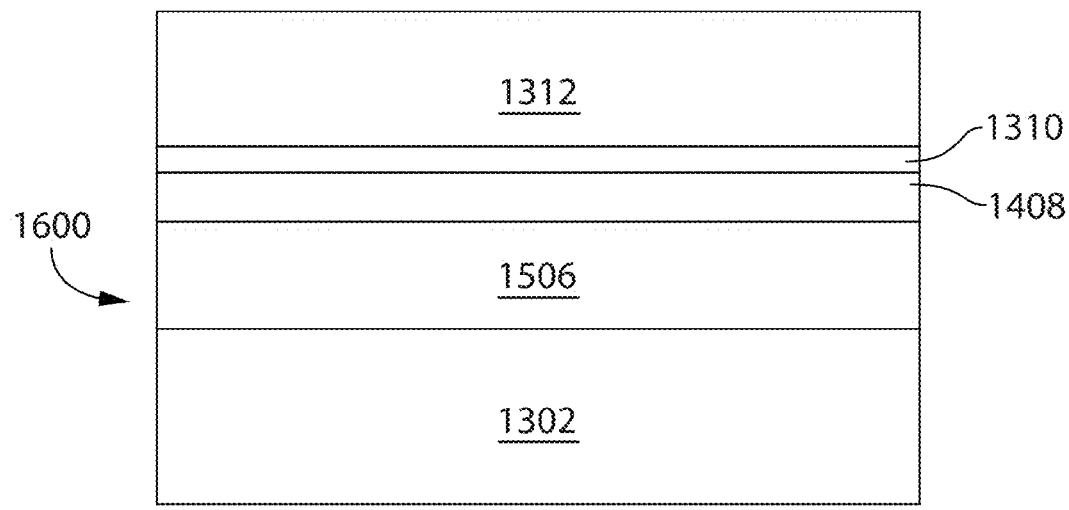
FIG. 16 is a schematic cross-section similar to those of FIGS. 13 to 15 but taken through an inherent color display produced by the overcoat layer process of the present invention.

As already indicated, the present invention may also be applied to inherent color displays, as illustrated in FIGS. 15 and 16. FIG. 15 is a schematic cross-section through a prior art display (generally designated 1500), which is generally similar to the display 1300 shown in FIG. 13 except that the electro-optic layer 1506 is an inherent color electro-optic layer which is capable of displaying a range of colors at every pixel of the display, as described, for example in U.S. Pat. No. 8,576,476, and the color filter array is omitted. FIG. 16 shows a display 1600 produced by the overcoat layer process of the present invention. As with the display 1400 described above, in the display 1600 the first adhesive layer 1304 is omitted and the second adhesive layer 1308 is replaced with a much thinner adhesive layer 1408 formed by polymerization of a solvent-free polymerizable liquid material. As with the display 1400 described above, eliminating the first adhesive layer 1304 allows more of the electric field applied to the display to reside within the electro-optic layer 1506, resulting in a brighter white state and higher contrast ratio. In addition, micro contrast will be greatly improved because blooming effects associated with the first adhesive will be eliminated, thereby increasing color gamut and image sharpness.

The overcoat layer process of the present invention may include various optional features. When the electro-optic layer is to be an encapsulated electrophoretic layer, the capsule slurry used to apply the capsules to the backplane may include surfactants, such as Triton X-100 or butanol, to improve wetting of the backplane. Prior to coating of the electro-optic layer, the backplane may be pre-coated with surfactants, such as Triton X-100 or butanol, or with a polyurethane latex. Alternatively or in addition, the backplane may be pre-treated with plasma (including atmospheric plasma) or corona discharge treatment. Such treatment may be effected at various power settings and with various gases, including but not limited to oxygen, nitrogen etc. As previously noted, in general it is preferred that the electro-optic layer in the overcoat layer process be applied by spray coating, including electrostatic spray coating, but other application techniques, such as slot die coating, blade coating and roll coating (including flexo and gravure techniques) may also be used. When the electro-optic layer is to be an encapsulated electrophoretic layer, the capsules are desirably in the form of a slurry containing a polymeric binder, for example a polyurethane latex.

Example 2

An overcoat layer process of the present invention was carried out by depositing capsules of an electrophoretic medium on to a backplane, overcoating the capsules with a solvent-free polymerizable liquid material and adhering a front electrode layer/front substrate (in the form of a poly (ethylene terephthalate) film coated on one surface with ITO) to the electrophoretic medium by means of the polymerizable liquid material.

The spraying of the capsules on to an active matrix backplane was effected using the spray coating process of the present invention and substantially as in Example 1 above using an HVLP nozzle at a pressure of 20 psig (about 330 MNw m$^{-2}$) measured at the nozzle inlet, with a gravity feed of the capsule dispersion at a mass flow rate of 25 to 35 g/min. The spray was directed vertically downward and deposition took place at near normal incidence on to a horizontal substrate so as to avoid inclined plane flow after deposition. The nozzle-to-substrate distance was 240 to 280 mm. The target coating weight was 20 g/m$^2$. Multiple spray heads and higher dilution coating slurries may contribute to increased coating uniformity.

The polymerizable liquid material used was formulated as follows (the various Sartomer resins used are available from Sartomer Americas, Inc., Overland Park, Kans.):
  Sartomer SR 9087 44.55% by weight
  Sartomer SR 9038 14.85% by weight
  Sartomer CN 3108 39.6% by weight
  TPO diphenyl (2,4,6-trimethylbenzoyl)-phosphine oxide 0.5% by wt.
  1-Hydroxycyclohexyl phenyl ketone 0.5% by weight.
These components were combined and placed on a roll mill for at least eight hours to ensure thorough mixing.

The displays were assembled as follows. A metal pan was covered with cardboard to provide cushioning, and a sheet of plastic release sheet was placed on top of the cardboard. The capsule-coated backplane was placed on this pan, and polyimide tape was used to cover the contacts on the backplane. A PET/ITO film was cut to the size of the backplane, placed over the capsule-coated backplane, and taped in place with polyimide tape. A sheet of metalized release sheet was placed on top of the stack, and the whole assembly moved to a laminator, with the roller closed just barely on the glass of the backplane. The laminator was set to 20 psi and 25 ft/min (7.62 m/min) to assure an ultraviolet-cured coating of the desired thickness. The PET/ITO was lifted up, allowing a bead of the polymerizable liquid mixture to be placed as close as possible to one edge of the PET/ITO film; the film was lifted for as long as possible while the roller moves the polymerizable liquid mixture to the opposed edge of the backplane. Finally, the metalized release film was removed and the polymerizable liquid mixture cured. The tape used to cover the contacts on the backplane was removed, and use carbon tape (or silver paste) applied to make electrical contact with the ITO layer.

The display thus produced was conditioned at 25° C. and 50% relative humidity for 5 days, then edge sealed with a hydrophobic UV curable polymer.

From the foregoing, it will be seen that the overcoat layer process of the present invention enables higher white state brightness in both color and monochrome displays, and increased color gamut in both inherent color and color filter array displays.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. A process for forming a monolayer of capsules on a substrate, the process comprising:
    depositing a solution of a water-swellable polymer on the substrate; and
    thereafter depositing a quantity of the capsules sufficient to form a monolayer of capsules on the substrate, and allowing the capsules to arrange themselves into a monolayer on the substrate.

2. A process according to claim 1, wherein the water-swellable polymer comprises at least one of a polysaccharide and a protein.

3. A process according to claim 2, wherein the polymer comprises at least one of a pectin or an albumin.

4. A process according to claim 3, wherein the polymer comprises egg albumin or bovine serum albumin.

5. A process according to claim 1, wherein the capsules are formed of a hydrophilic material and the polymer solution is aqueous.

6. A process according to claim 1, wherein the deposition of the capsules is effected by spray coating.

* * * * *